(12) United States Patent
Agura et al.

(10) Patent No.: US 11,887,234 B2
(45) Date of Patent: Jan. 30, 2024

(54) AVATAR DISPLAY DEVICE, AVATAR GENERATING DEVICE, AND PROGRAM

(71) Applicant: SOFTBANK CORP., Tokyo (JP)

(72) Inventors: Katsuhide Agura, Tokyo (JP); Takuya Sakaguchi, Tokyo (JP); Nobuyuki Oka, Tokyo (JP); Takeshi Fukuizumi, Tokyo (JP)

(73) Assignee: Softbank Corp., Tokyo (JP)

( * ) Notice: Subject to any disclaimer, the term of this patent is extended or adjusted under 35 U.S.C. 154(b) by 0 days.

(21) Appl. No.: 17/764,149

(22) PCT Filed: Dec. 23, 2021

(86) PCT No.: PCT/JP2021/047876
§ 371 (c)(1),
(2) Date: Mar. 25, 2022

(87) PCT Pub. No.: WO2023/119557
PCT Pub. Date: Jun. 29, 2023

(65) Prior Publication Data
US 2023/0206531 A1    Jun. 29, 2023

(51) Int. Cl.
*G06T 13/40* (2011.01)
*G06T 11/40* (2006.01)
*G06T 11/00* (2006.01)

(52) U.S. Cl.
CPC ............ *G06T 13/40* (2013.01); *G06T 11/001* (2013.01); *G06T 11/40* (2013.01)

(58) Field of Classification Search
CPC ........ G06T 13/40; G06T 11/001; G06T 11/40
See application file for complete search history.

(56) References Cited

U.S. PATENT DOCUMENTS

| | | |
|---|---|---|
| 2007/0159486 A1 | 7/2007 | Sasaki |
| 2012/0299912 A1 | 11/2012 | Kapur et al. |
| 2014/0098183 A1* | 4/2014 | Smith .................. H04N 9/3185 348/E7.083 |
| 2015/0163454 A1 | 6/2015 | Smith et al. |
| 2019/0244410 A1 | 8/2019 | Viklund et al. |

FOREIGN PATENT DOCUMENTS

| | | | |
|---|---|---|---|
| CA | 3037047 A1 * | 4/2018 | ......... G02B 27/0093 |
| JP | 2009-523288 A | 6/2009 | |
| JP | 2015-531098 A | 10/2015 | |
| JP | 2016-500954 A | 1/2016 | |
| KR | 10-1866407 B1 | 6/2018 | |

OTHER PUBLICATIONS

Request for the Submission of an Opinion dated Nov. 24, 2023, directed to Korean Application No. 10-2022-7009844; 15 pages.

* cited by examiner

*Primary Examiner* — Antonio A Caschera
(74) *Attorney, Agent, or Firm* — Morrison & Foerster LLP

(57) ABSTRACT

An avatar display device includes: an obtaining part that obtains captured image data of a person; a second obtaining part that obtains, from the captured image data, depth data or image data of the person; a generating part that composes a 3D model in accordance with the depth data or image data to generate an avatar; and a display part that displays, in an image display area of an information communication device, the avatar that is caused to follow a motion of the person.

10 Claims, 14 Drawing Sheets

FIG. 6
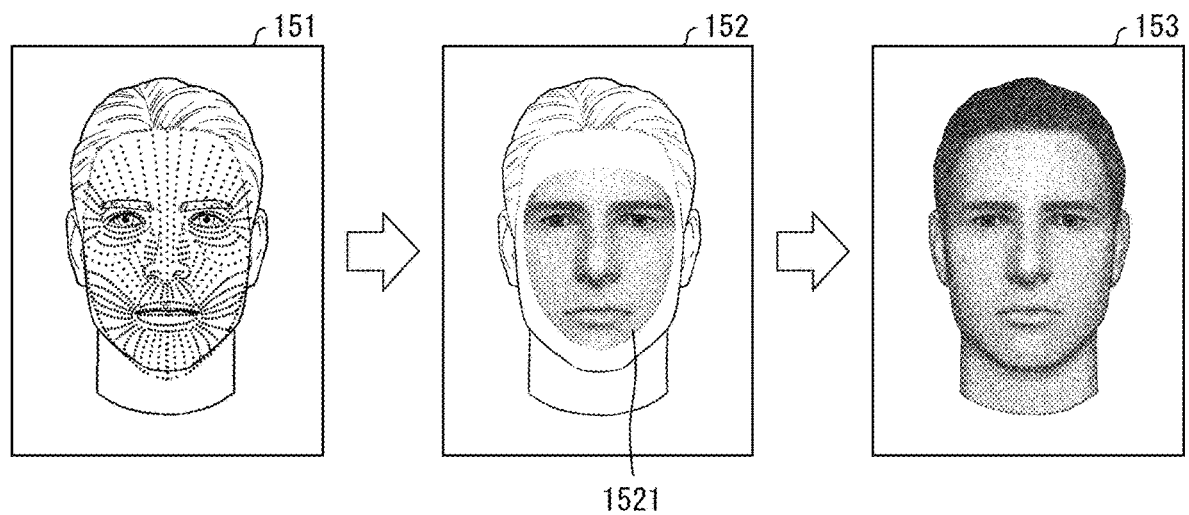
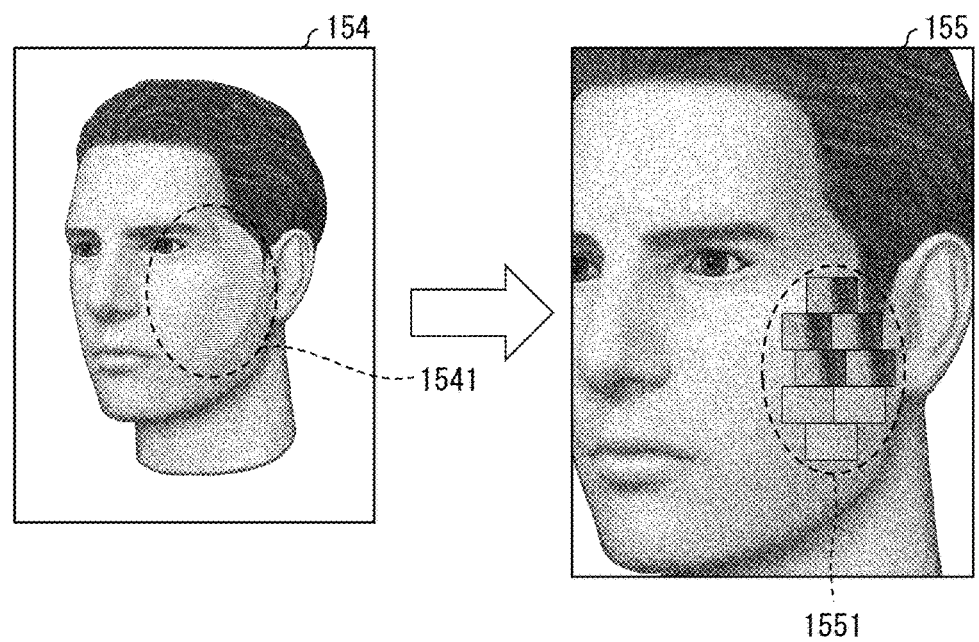

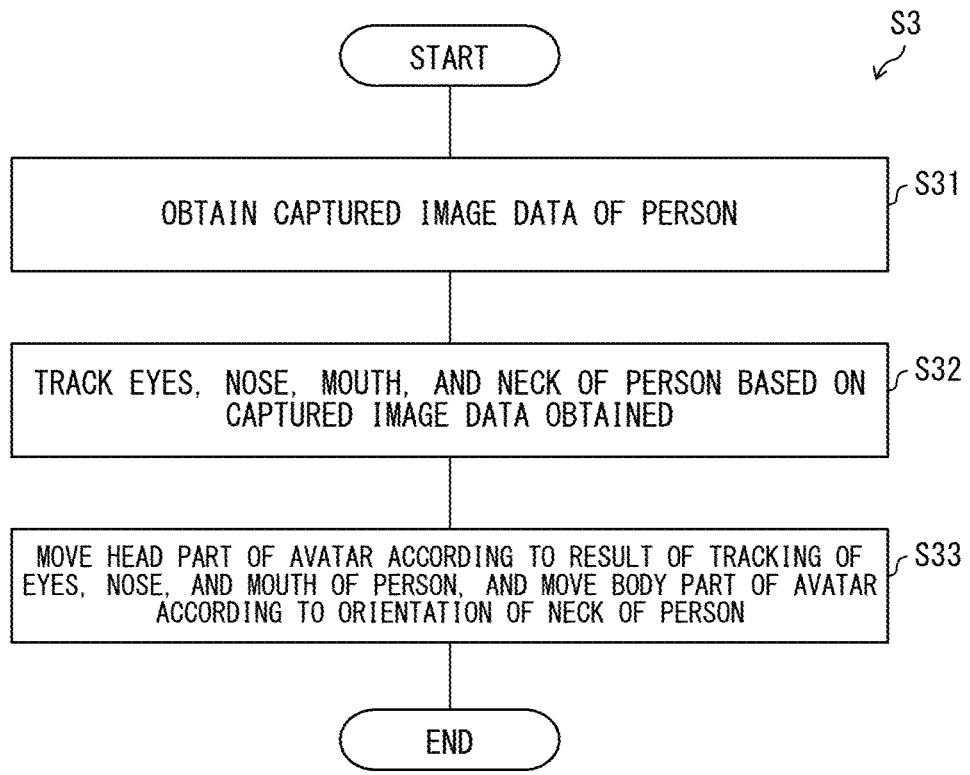
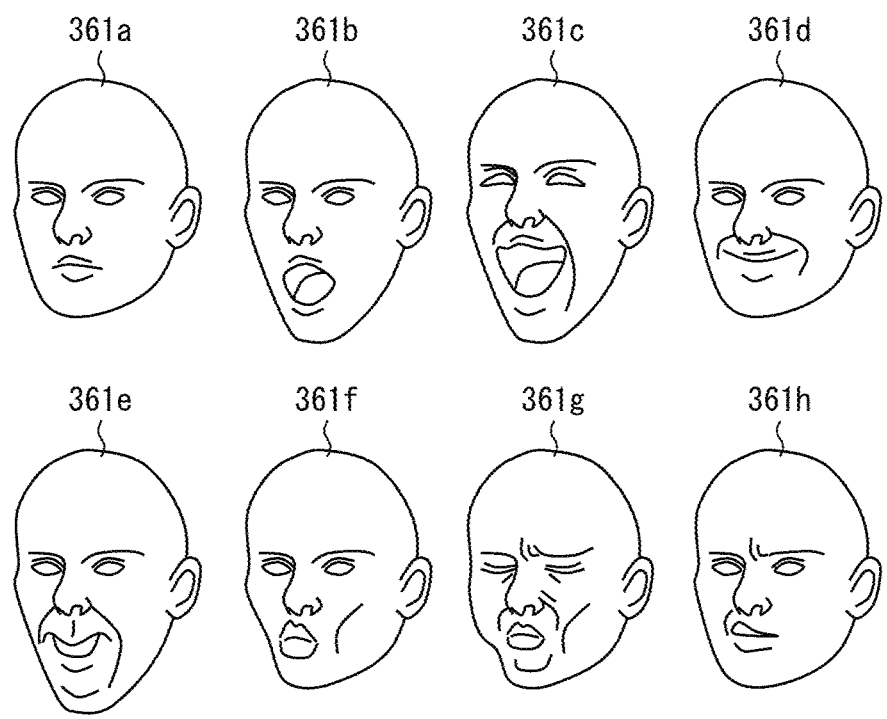

AVATAR DISPLAY DEVICE, AVATAR GENERATING DEVICE, AND PROGRAM

CROSS-REFERENCE TO RELATED APPLICATIONS

This application is a U.S. national stage application under 35 U.S.C. § 371 of International Application No. PCT/JP2021/047876, filed Dec. 23, 2021.

FIELD OF THE DISCLOSURE

The present invention relates to an avatar display device, an avatar generating device, and a program.

BACKGROUND OF THE DISCLOSURE

There have been known conventional techniques for expressing a person by computer graphics. For example, Patent Literature 1 discloses a technique for generating a facial animation using a face mesh. Patent Literature 1 states that this technique can generate a realistic facial animation of a face image of a person.
Patent Literature 1: Published Japanese Translation of PCT International Application, Tokuhyo, No. 2009-523288

SUMMARY OF THE DISCLOSURE

Although the conventional technique such as that described above can reproduce realistic facial expressions, the facial expressions are merely an animation. Thus, such a technique is not a technique for generating an avatar. Recently, a lot of attraction is paid to an avatar, which is another body of a user in an image. There is a demand for a technique for generating an avatar that expresses a user in an effective way.

In order to attain the above object, an avatar display device in accordance with an aspect of the present invention includes: an obtaining part that obtains captured image data of a person; a second obtaining part that obtains, from the captured image data, depth data or image data of the person; a generating part that composes a three-dimensional model in accordance with the depth data or the image data to generate an avatar; and a display part that displays, in an image display area of an information communication device, the avatar that is caused to follow a motion of the person.

In order to attain the above object, an avatar generating device in accordance with an aspect of the present invention includes: an obtaining part that obtains captured image data of a person; a second obtaining part that obtains, from the captured image data, depth data or image data of the person; a generating part that composes a three-dimensional model in accordance with the depth data or the image data to generate an avatar; and an output part that outputs the avatar thus generated.

The avatar display device and the avatar generating device in accordance with the above aspects of the present invention can be realized by a computer. In this case, the present invention encompasses: a control program for an avatar display device which control program causes a computer to operate as each part (software element) of the avatar display device so that the avatar display device can be realized by the computer; and a computer-readable storage medium in which the control program is stored.

BRIEF DESCRIPTION OF THE FIGURES

FIG. 6 is a conceptual view illustrating a process for generating an avatar with use of texture data.

FIG. 12 is a flowchart illustrating a flow of an avatar display method in accordance with Embodiment 3.

FIG. 13 shows examples of facial expressions to be followed by an avatar.

DETAILED DESCRIPTION OF THE DISCLOSURE

Embodiment 1

Avatar Display System

Figure 1:
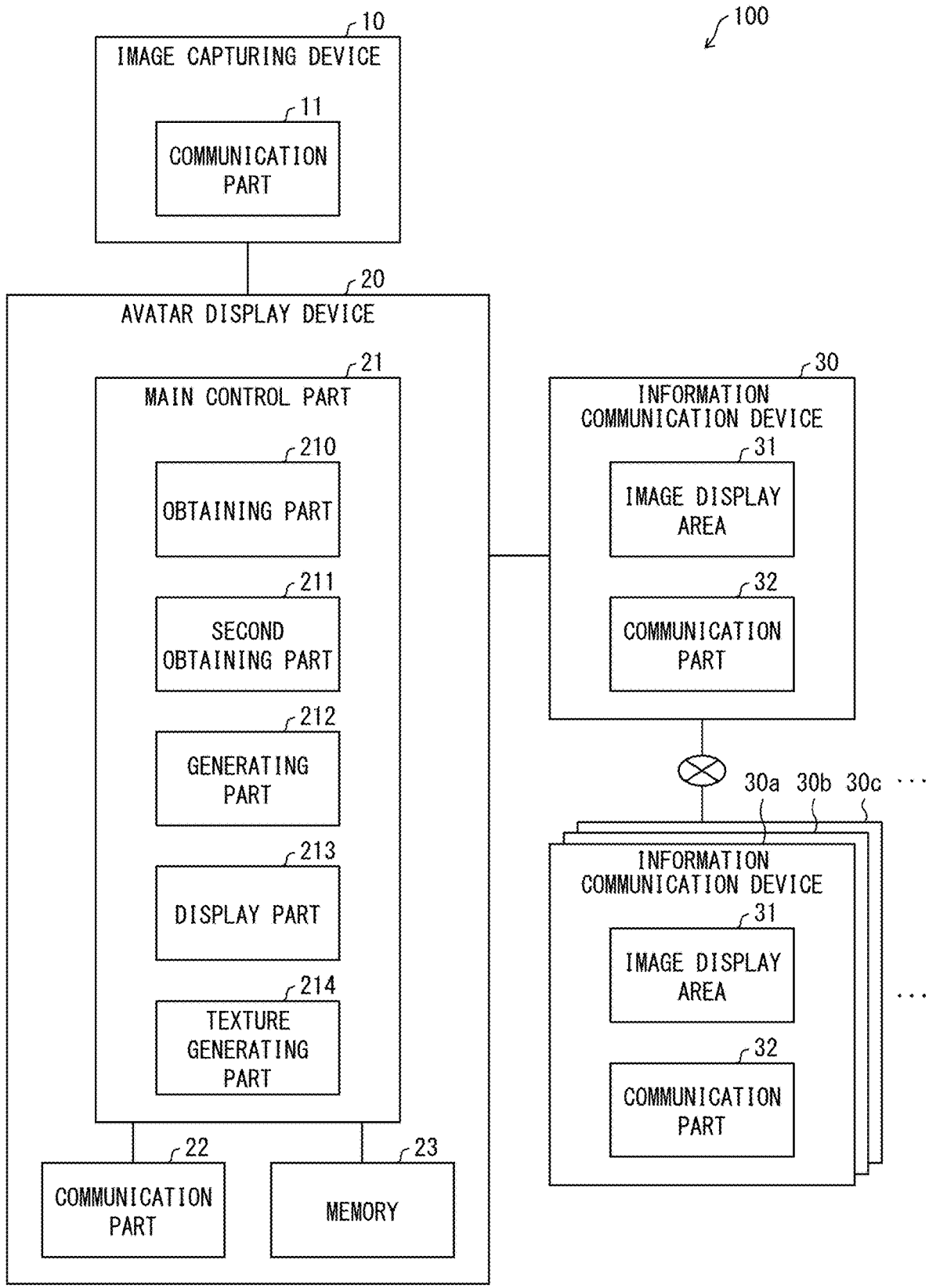
FIG. 1 is a block diagram illustrating an avatar display system in accordance with Embodiment 1 of the present invention.

The following description will discuss, in detail, an embodiment of the present invention. FIG. 1 is a block diagram illustrating a configuration of an avatar display system 100 in accordance with Embodiment 1. The avatar display system 100 includes an image capturing device 10, an avatar display device 20, and an information communication device 30. The information communication device 30 is an information communication device used by a user, and is connected, via a network, with information communication devices 30a, 30b, 30c, . . . used by other users. The information communication devices may be connected with each other via peer-to-peer (P2P) network or via a server (not illustrated).

In Embodiment 1, the avatar display system refers to a system that displays an avatar in an image display area of the information communication device, and the avatar display device refers to a device that displays an avatar in the image display area of the information communication device. The information communication device in which the avatar is to be displayed may be the information communication device 30 used by the user, any of the information communication devices 30a, 30b, 30c, . . . used by the other users, or both of them.

The image capturing device 10 is a device that captures an image of a person (user) whose avatar is to be generated. The image capturing device 10 can obtain a still image or a moving image, and includes a communication part 11 that transmits, to the avatar display device 20, the captured image data thus obtained.

In an aspect, the image capturing device 10 may be a depth camera that is capable of not only capturing an image (e.g., an RGB image) but also measuring a distance (depth) to a subject. The distance may be measured by a known technique, for example, by three-dimensional light detection and ranging (Lidar), triangulation involving use of, e.g., an infrared ray, or a time-of-flight (TOF) method. In an aspect, the image capturing device 10 may be a stereo camera including two or more image-capturing parts. The captured image data obtained by the image capturing device 10 may include information indicating the depth. The captured image data including the information indicating the depth may also simply be referred to as "captured image data".

For example, the communication part 11 is a radio communication interface such as a Bluetooth (registered trademark) or Wi-Fi (registered trademark) communication interface, and is connectable with a network. For another example, the communication part 11 may be a wired connection interface. The image capturing device 10 may be a video camera having a communication function. Alternatively, the image capturing device 10 may be a personal computer, a mobile communication terminal, or the like each having a communication function and an image capturing device, for example. The mobile communication terminal may be a mobile phone or a tablet, for example.

The avatar display device 20 may include a main control part 21, a communication part 22, and a memory 23. The main control part 21 may include an obtaining part 210, a second obtaining part 211, a generating part 212, a display part 213, and a texture generating part 214.

The second obtaining part 211 may obtain (calculate) depth data from the captured image data. As will be described later, the second obtaining part 211 may obtain image data from the captured image data. The generating part 212 may compose a 3D model in accordance with the depth data to generate an avatar. In an aspect, the generating part 212 may combine, into the 3D model, texture data of the person generated by the texture generating part 214, so as to generate an avatar. A method for generating an avatar will be described in detail later.

The display part 213 may use the avatar generated by the generating part 212 to generate avatar display data for use in displaying the avatar that is caused to follow a motion of the person, and may transmit the avatar display data to the information communication device 30 via the communication part 22. The information communication device 30 may transmit, as necessary, the avatar display data to the information communication devices 30a, 30b, 30c, . . . . Consequently, the display part 213 may display, in an image display area(s) 31 of all or part of the information communication devices 30, 30a, 30b, 30c, . . . , the avatar that is caused to follow the motion of the person. Note that, in transmitting the avatar display data, the display part 213 may transmit only a difference between the avatar display data and the past avatar display data to the information communication device 30.

In an aspect, the avatar display data may be a moving image of the avatar. In one example, the display part 213 may generate the avatar display data by replacing, with the avatar that is caused to follow the motion of the person, a person in each frame image in the moving image obtained by the image capturing device 10.

In Embodiment 1, the expression "replace" means any image processing with which a part of an image apparently seems to be replaced with another image. Examples of such image processing encompass: processing with which, in the moving image, a roughly-taken area of the person is replaced with the avatar image; and processing with which an image of a person area and the avatar image are overlaid at a given transmittance.

In another example, by a method other than the method with which a person in another moving image is replaced with the avatar that follows the motion of the person, the display part 213 may generate the moving image of the avatar that is caused to follow the motion of the person. Specifically, by combining, into a given still image or a given moving image, the avatar that is caused to follow the motion of the person, the display part 213 may generate the moving image of the avatar that is caused to follow the motion of the person.

In an aspect, the data for use in displaying the avatar that is caused to follow the motion of the person may be data of the avatar that is caused to follow the motion of the person. In one example, the display part 213 may transmit, to the information communication device 30 via the communication part 22, data indicating the avatar generated by the generating part 212 and motion data indicating a motion of the avatar that follows the motion of the person, thereby displaying, in the image display area(s) 31 of all or part of the information communication devices 30, 30a, 30b, 30c, . . . , the avatar that is caused to follow the motion of the person.

The texture generating part 214 may generate texture data of the person in accordance with the captured image data. The texture generating part 214 will be described in detail later.

The main control part 21 of the avatar display device 20 may include at least one processor, and may be configured such that the at least one processor reads out an avatar display program stored in the memory 23 and executes the avatar display program so as to realize the functions of the generating part 212 and the display part 213. A program for realizing the function of the generating part 212 and a program for realizing the function of the display part 213 may be separated from each other and may be stored in memories in respective different devices. This configuration will be described later.

The communication part 22 receives an image from the image capturing device 10, and transmits the avatar display data to the information communication device 30. For example, the communication part 22 is a radio communication interface such as a Bluetooth (registered trademark) or Wi-Fi (registered trademark) communication interface, and is connectable with a network. For another example, the communication part 22 may be a wired connection interface.

The main control part 21 records (stores), in the memory 23, the image obtained via the communication part 22.

The memory 23 stores therein various programs to be executed by the main control part 21 and various data and/or the like to be referred to by the programs. The memory 23 also stores therein the avatar generated by the generating part 212. In addition, the memory 23 records therein a still image and a moving image obtained by the image capturing device 10.

The information communication devices 30, 30a, 30b, 30c, . . . are devices that can carry out wireless communication or radio communication with other information communication device(s). Examples of the information communication devices 30, 30a, 30b, 30c, . . . encompass a personal computer, a mobile communication terminal, and a television and a 3D viewer each of which is for a video meeting and has a communication function. Examples of the 3D viewer encompass headsets and goggle type display devices each of which can display an xR (virtual reality (VR), augmented reality (AR), mixed reality (MR)) space and/or the like.

Each of the information communication devices 30, 30a, 30b, 30c, . . . may include the image display area 31 and a communication part 32. The image display area 31 displays an image. The image display area 31 may be part or whole of a display included in the information communication device 30. For example, the communication part 32 is a radio communication interface such as a Bluetooth (registered trademark) or Wi-Fi (registered trademark) communication interface, and is connectable with a network such as the Internet.

The communication part 32 of the information communication device 30 may receive the avatar display data from the avatar display device 20 and transmit the avatar display data to the information communication devices 30, 30a, 30b, 30c, . . . . In this manner, each of the information communication devices may directly or indirectly receive the avatar display data from the avatar display device 20. The image display area(s) 31 of at least part of the information communication devices 30, 30a, 30b, 30c, . . . may display, as a result of operation of an application(s) included in the at least part of the information communication devices, an avatar that follows a motion of a person in accordance with the avatar display data.

More specifically, for example, the applications included in the information communication devices may be applications each of which realizes a communication system. The image display area 31 may be an area that is on a display or a viewer and that serves as a participant image display area for displaying a participant who participates in the communication system. An image displayed on the participant image display area may be a two-dimensional image or a three-dimensional image. A user of the avatar display system 100 can display, in the participant image display area, his/her avatar as a participant. Alternatively, the user may not display his/her avatar in the participant image display area of the information communication device 30 used by the user, and may display his/her avatar in the participant image display areas of the information communication devices 30a, 30b, 30c, . . . used by other users.

The communication system may be, for example, a communication system involving use of a moving image or a communication system involving use of a virtual space. The communication system involving use of a moving image is a system via which a user can communicate with another person while seeing a moving image or an avatar of the another person. Examples of the communication system encompass a teleconferencing system and a videotelephony system. The communication system involving use of a virtual space is a system via which a user can communicate with an avatar displayed in the virtual space. The virtual space may be the one that can be recognized with the VR, AR, or MR technique, and may be a VR space, for example. Examples of the system via which communication is carried out with the avatar displayed in the virtual space encompass metaverse and VRChat (registered trademark).

Avatar Display Method

Figure 2:
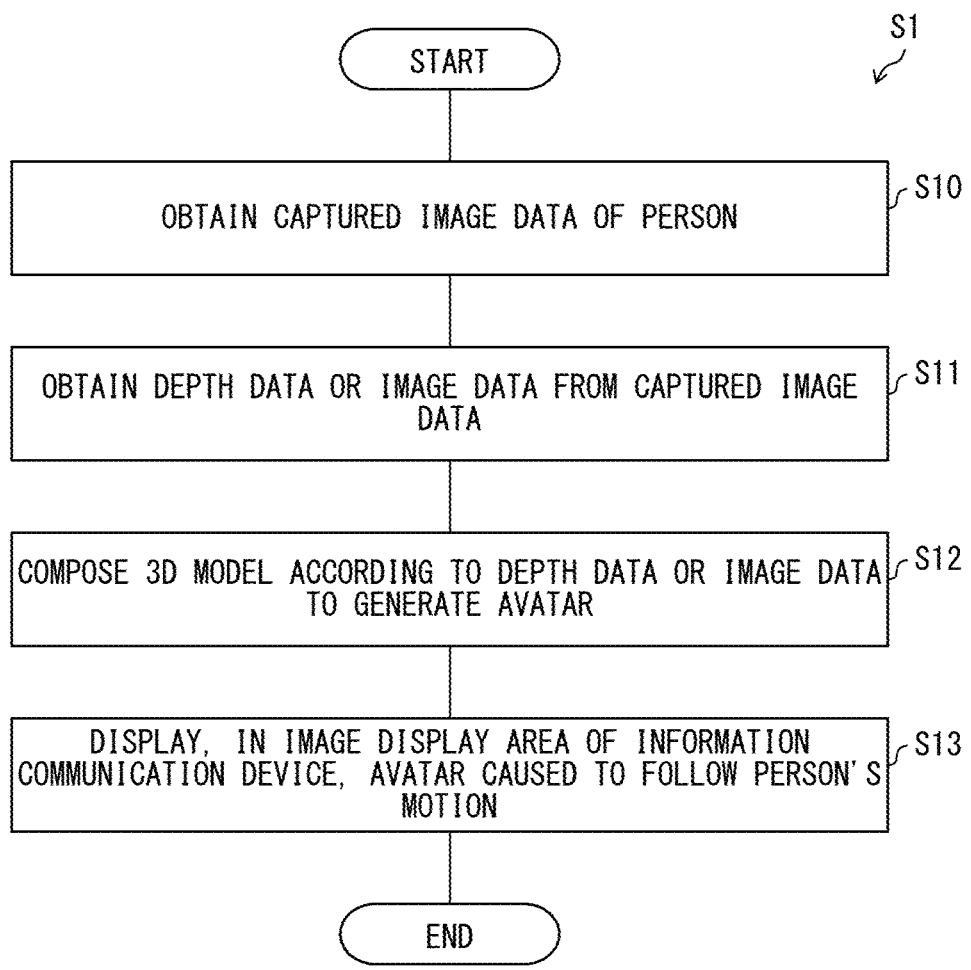
FIG. 2 is a flowchart illustrating a flow of an avatar display method in accordance with Embodiment 1.

Next, the following description will discuss an avatar display method S1 to be executed by the avatar display device 20 in accordance with Embodiment 1. FIG. 2 is a flowchart illustrating a flow of the avatar display method S1. The avatar display method S1 includes the following steps. First, in step S10, the image capturing device 10 may capture an image of a person and generate captured image data. The obtaining part 210 of the avatar display device 20 may obtain, via the communication part 22 and the communication part 11, the captured image data generated by the image capturing device 10, and may record the captured image data in the memory 23.

Then, in step S11, the second obtaining part 211 may obtain (calculate), from the captured image data obtained by the obtaining part 210, depth data of the person. In one example, the second obtaining part 211 may obtain, as the depth data of the person, point group (three-dimensional) data. In a case where the captured image data includes multi-viewpoint image data captured by a stereo camera, the second obtaining part 211 may analyze a correlation between multi-viewpoint images included in the captured image data to calculate the depth data. In a case where the captured image data includes information indicating the depth (e.g., in a case where the captured image data includes a depth image), the second obtaining part 211 may calculate the depth data (e.g., point group (three-dimensional) data) of the person in accordance with the information indicating the depth included in the captured image data. In this process, the second obtaining part 211 may remove a background with reference to the depth data. In one example, the second obtaining part 211 can remove the background by removing, with reference to the depth data, an object(s) other than a largest object from among objects closest to the image capturing device 10. The removal is carried out in this manner since, at the time of capturing of an image for generating an avatar of a person, the person is often at a position closest to the image capturing device 10.

Subsequently, in step S12, the generating part 212 composes a 3D model in accordance with the depth data calculated by the second obtaining part 211 so as to generate an avatar. The generating part 212 may record, in the memory 23, the avatar thus generated. Then, in step S13, the display part 213 generates avatar display data for use in displaying the avatar that is caused to follow a motion of the person, and transmits the avatar display data to the information communication device 30 via the communication part 22, thereby displaying, in the image display area(s) 31 of at least one of the information communication devices 30, 30a, 30b, 30c, . . . , the avatar that is caused to follow the motion of the person.

In an aspect, the display part 213 may generate the avatar that follows the motion of the person, by reading out the avatar stored in the memory 23 and causing the avatar to follow the motion of the person. For example, the display part 213 may generate the avatar that follows the motion of the person, by changing an orientation of the avatar so as to follow motions (orientations) of various parts of the person and positioning the avatar so as to follow the position of the person. A method for determining the position and orientation of the person will be described later.

Subsequently, the display part 213 may generate the avatar display data by (i) replacing, with the avatar that is caused to follow the motion of the person, a person in each image frame in the captured image data recorded in the memory 23 or (ii) combining the avatar that is caused to follow the motion of the person into each frame in a given still image or a given moving image. Then, the display part 213 may transmit the avatar display data to the information communication device 30 via the communication part 22.

In another aspect, the display part 213 may generate motion data indicating a motion of the avatar that follows a motion of the person, and may transmit, as avatar display data, the motion data and the data of the avatar read out from the memory 23 to the information communication device 30 via the communication part 22. For example, the display part 213 may generate motion data that gives, on a time-series basis, instructions as to motions (orientations) and positions of various parts of the avatar that respectively correspond to motions (orientations) and positions of various parts of the person.

Generating Avatar and Avatar's Following Person's Motion

Next, the following description will discuss, with reference to the drawings, generating an avatar and avatar's following person's motion. The generating part 212 composes, in accordance with depth data indicating a depth to a face of a person which depth data is obtained by the image capturing device 10, a 3D model of a head part of the person to generate an avatar of the person. A specific method therefor will be described below. The method described below is a method for generating an avatar of a head part of a person and displaying the avatar. However, a part of which avatar is to be generated and displayed is not limited to the head part (the part above the neck), but may be an upper-half body (a part including shoulders and a chest) or the whole body. That is, the generating part 212 may generate, for example, an avatar of the head part of the person, an avatar of the upper-half body of the person, or an avatar of the whole body of the person. Alternatively, the generating part 212 may generate an avatar constituted by separate parts, for example, an avatar constituted by a head part and arms.

Figure 3:
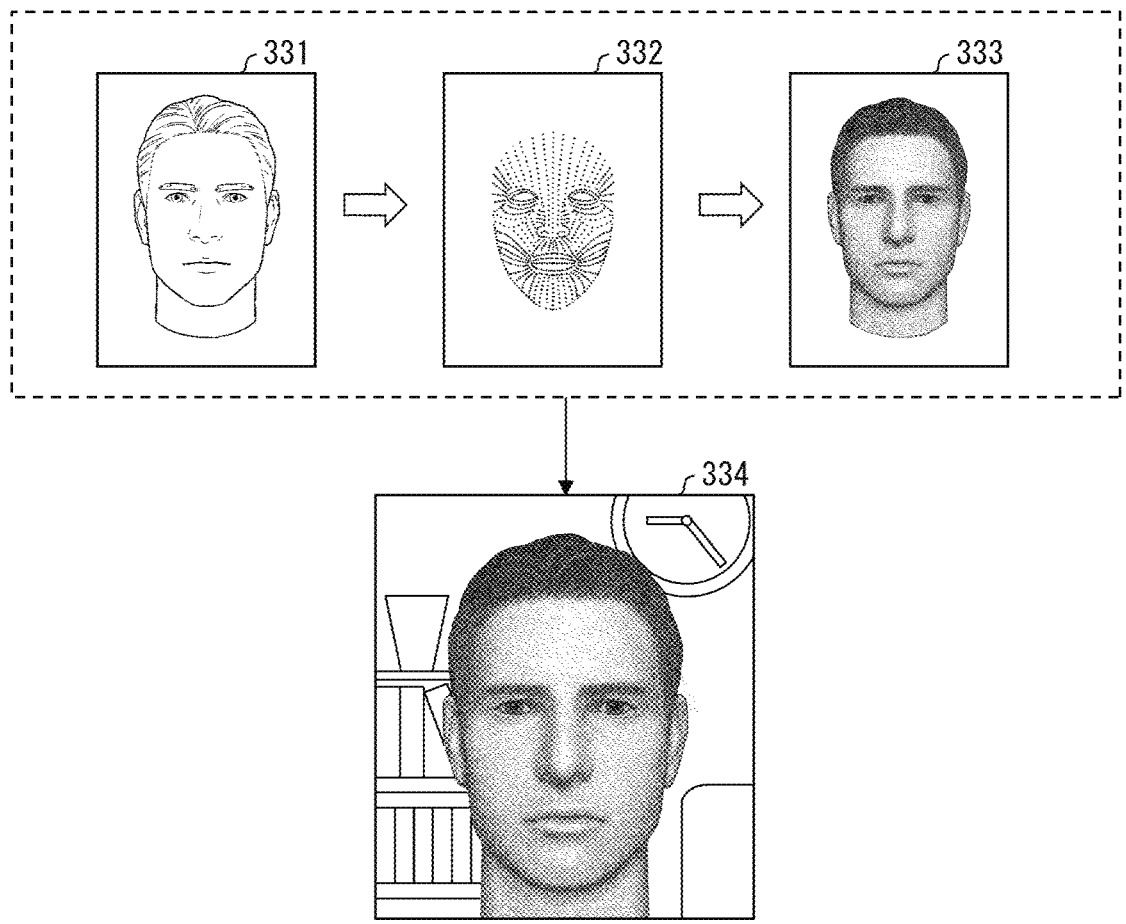
FIG. 3 is a conceptual view illustrating an example of a procedure for generating an avatar of an upper-half body and displaying the avatar.

FIG. 3 is a conceptual view illustrating an example of a procedure for generating an avatar of a head part. The obtaining part 210 obtains, from the image capturing device 10, captured image data for use in generation of an avatar. An image 331 in FIG. 3 is captured image data, obtained from the image capturing device 10, of a front face of a person whose avatar is to be generated. The second obtaining part 211 calculates, as depth data of the person, point group (three-dimensional) data 332. The point group (three-dimensional) data 332 is depth data representing the depth (three-dimensional shape) of the face by discrete point group data.

Next, the generating part 212 generates a face model in accordance with the point group data 332, and merges the face model with a head part model, so as to generate a head part avatar 333. The head part model will be described later. The generating part 212 may attach texture to the point group data 332 to generate a face model. Alternatively, the generating part 212 may construct, from the point group data 332, a 3D (three-dimensional) model with use of triangular meshes and attach texture thereto. The texture will be described later.

Note that the generating part 212 does not need to generate the face model with use of all pieces of depth data of the face. The generating part 212 may generate the avatar with use of, from among the pieces of depth data of the face, at least one of depth data corresponding to eyes, depth data corresponding to a nose, and depth data corresponding to a mouth. As the depth data corresponding to the eyes, depth data of one or more feature points of the eyes and/or a part(s) around the eyes can be employed. The number of feature points is not particularly limited. The one or more feature points of the eyes and/or the part(s) around the eyes may include a feature point corresponding to an eyebrow. As the depth data corresponding to the nose, depth data of one or more feature points of the nose and/or a part(s) around the nose can be employed. The number of feature points is not particularly limited. As the depth data corresponding to the mouth, depth data of one or more feature points of the mouth and/or a part(s) around the mouth can be employed. The number of feature points is not particularly limited. The one or more feature points of the mouth and/or the part(s) around the mouth may include a feature point corresponding to a jaw.

Figure 4:
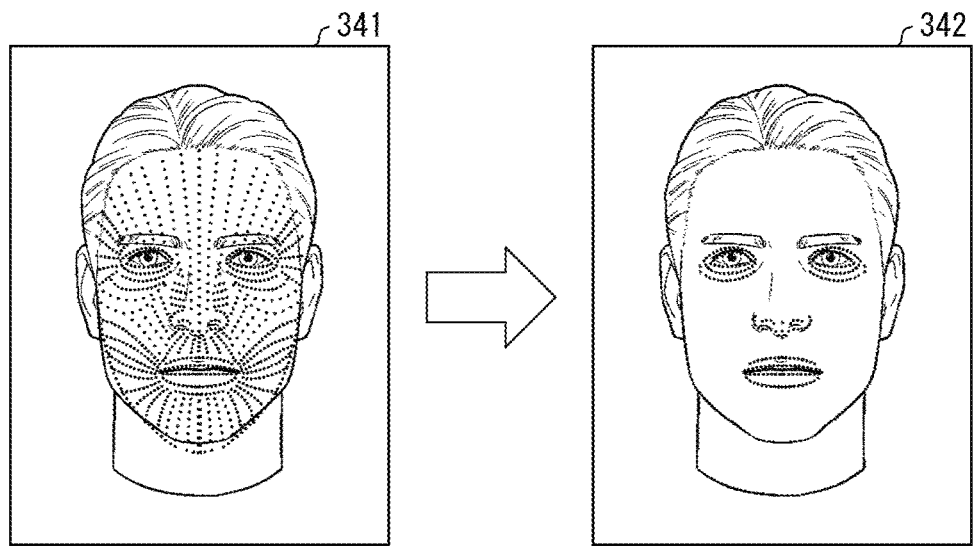
FIG. 4 is a view illustrating extracting, from point group data of a face, only data corresponding to eyes, a nose, and a mouth.

FIG. 4 is a view illustrating extracting, from point group data of a face, feature points corresponding to three parts, i.e., eyes, a nose, and a mouth. In FIG. 4, an image 341 is an image showing point group data of the whole face, and an image 342 is an image including only feature points corresponding to eyes, a nose, and a mouth extracted from the point group data. This shows that the position and orientation of a face can be determined only from arrangement of the eyes, nose, and mouth, and further shows that the image 342 has a smaller quantity of data than in the image 341. Thus, by generating an avatar with use of at least one of the data corresponding to the eyes, the data corresponding to the nose, and the data corresponding to the mouth, with each of which the position and orientation of the face can easily be acknowledged and the features of the face can easily be represented, it is possible to reduce the quantity of data of the avatar than in a configuration in which an avatar is generated with use of data of the whole face, while maintaining the features of the person. This can lead to a speedup in the image processing.

A method for generating a 3D model of a face in accordance with at least one of depth data corresponding to eyes, depth data corresponding to a nose, and depth data corresponding to a mouth is not limited to any particular one. For example, the generating part 212 may generate a 3D model of a face with use of a learning model constructed by machine learning carried out using, as teaching data, combinations of (i) 3D models of various faces and (ii) at least one of depth data corresponding to eyes, depth data corresponding to noses, and depth data corresponding to mouths of these 3D models.

Figure 5:
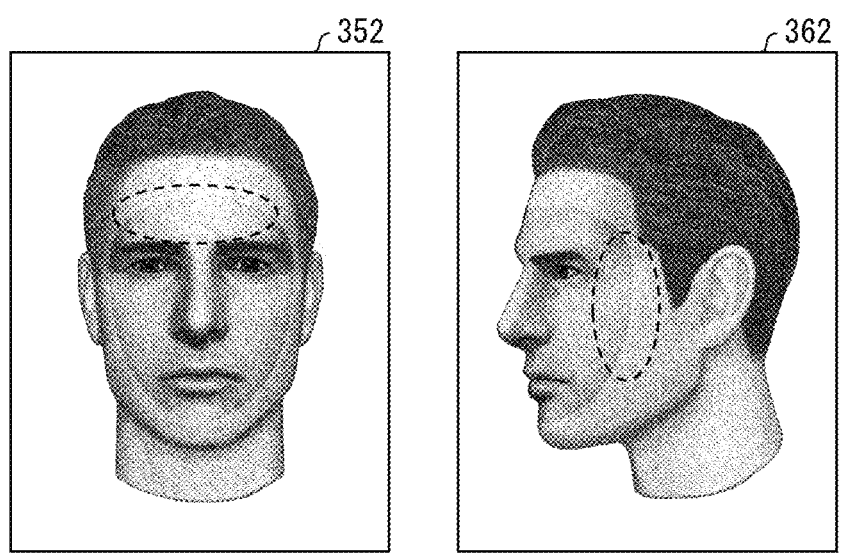
FIG. 5 is a conceptual view illustrating a process for jointing a face model of a person to an upper-half body model to generate an avatar.

FIG. 5 is a conceptual view illustrating a process for connecting a face model of a person with a head part model to generate the head part avatar 333. An image 352 is an image in which a boundary between the face and the hair in the head part model is determined by the generating part 212. An image 362 is an image in which a boundary between the face and the both sides of the face in the head part model is determined by the generating part 212. In the parts of the images 352 and 362 which parts are surrounded by the ellipses, the generating part 212 can smoothly merges the face model and the head part model with each other by a known algorithm such as a blend shape technique, so as to generate the head part avatar 333.

The avatar generated by the generating part 212 is in a dedicated file format for a three-dimensional avatar, for example, and is recorded in the memory 23. The data format may be, for example, a VRM format. However, this is not limitative. Note that some platforms or some applications for displaying an avatar cannot display the avatar recorded in the VRM format. In such a case, the avatar recorded in the VRM format may be converted into a data format that can be handled by the application. That is, the generating part 212 may generate an avatar in a data format compatible with the application or system in which the avatar is to be used.

In an aspect, the display part 213 can replace, with the head part avatar 333 generated by the generating part 212, a person in the captured image data to generate avatar display data 334 including a background. In another aspect, the display part 213 may merge, with a given background image, the head part avatar 333 generated by the generating part 212 to generate avatar display data 334. In further another aspect, the display part 213 may generate motion data indicating a motion of the avatar in the later-described manner, and then may merge the motion data with the head part avatar 333 generated by the generating part 212 to generate avatar display data 334.

The foregoing has discussed the example in which the face model and the head part model are combined. However, the present invention is not limited to this method. Alternatively, a face model and an upper-half body model may be combined. Further alternatively, a face model and another body part model may be combined. The head part model, the upper-half body model, the whole body model, and the another body part model to be combined may be prepared in any of the following manners. That is, the existing models may be used after the sizes thereof are adjusted. Alternatively, new models may be generated in accordance with a result of a measurement of the person and may be stored in the memory 23. Further alternatively, from many existing models prepared in advance, a user may select one(s) or the generating part 212 may select a model similar to the image of the user captured by the image capturing device 10.

The generating part 212 may combine the face model of the person with (i) a head part model, an upper-half body model, a whole body model, or another body part model of a character who is not the person or (ii) a head part model, an upper-half body model, a whole body model, or another body part of a different sex of himself/herself. With this, it is possible to generator an avatar different in character and/or sex from the person, while maintaining the feature(s) of the person's face.

Next, the following will explain a method for detecting an orientation of a head part of a person in a moving image. As described above, it is possible to determine the orientation of the face from at least one of eyes, a nose, and a mouth. For example, since the shapes and arrangement of the two eyes of a person are substantially fixed, it is possible to determine the orientation of the face in accordance with the shapes of the eyes and the positional relation between the eyes. The orientation of the face can be expressed with use of a vector on a spherical coordinate system using, as an origin, a certain position preliminarily determined. The display part 213 detects at least one of the eyes, nose, and mouth of the person from the captured image of the person which captured image is captured by the image capturing device 10. Then, the display part 213 refers to the orientation of the face determined in accordance with the position of at least one of the eyes, nose, and mouth having been detected, and replaces the image with another one so that the avatar faces that orientation. Note that the position of the head part can be determined as coordinates representing a part that is a predetermined reference head part. By determining the position and orientation of the head part of the person in the image in this manner and causing the position and orientation of the head part avatar 333 to follow the position and orientation of the head part of the person, it is possible to obtain the avatar that follows a motion of the person.

The following will explain the texture. The generating part 212 may generate the face model with use of generally-used skin color texture, for example. In order to make the avatar to look more like the face of the actual person (user), the generating part 212 may use texture that is generated in accordance with the captured image data. The texture generating part 214 may first generate texture data of the face of the person from the captured image data obtained by the obtaining part 210. FIG. 6 is a conceptual view illustrating a process for generating an avatar with use of the texture data generated by the texture generating part 214.

The generating part 212 generates a face model 1521, such as the one shown in an image 152, in accordance with depth data calculated by the second obtaining part 211, such as the one shown in an image 151. Then, the generating part 212 combines, with the face model 1521 thus generated, the texture data generated by the texture generating part 214, so as to generate a face model such as that shown in the image 153. Consequently, it is possible to generate an avatar looking more like the actual one.

Note that the texture generating part 214 may fail to generate texture data of a part of the face of the person which part is not included in the captured image data, since the texture generating part 214 generates the texture data in accordance with the captured image data. For example, in some cases, texture data of both side ends of the face may be generated in accordance with the background of the person, as shown in the part indicated by an ellipse 1541 in an image 154. In order to deal with this, as shown in the part indicated by an ellipse 1551 in an image 155, the texture generating part 214 may compensate, with texture data of a part in the vicinity of the part of the face of the person which part is not included in the captured image data, the texture data of the part of the face of the person which part is not included in the captured image data.

As described above, in a case where the generating part 212 combines the face model of the person with a model of a body of a character who is not the person or a model of a body of a different sex of himself/herself, texture data prepared in advance for the character and/or the different sex may be used to generate an avatar.

With the avatar display system 100 and the avatar display method S1 configured as above, it is possible to generate an avatar of a user in accordance with an image of the user captured by the image capturing device 10 and to display the avatar in the image display area(s) 31 of the information communication device(s) 30, 30a, 30b, 30c, . . . . That is, it is possible to provide a technique for generating, from an image, an avatar of a user in accordance with the image and displaying the avatar. In addition, with the configuration in which the generating part 212 generates an avatar with use of texture data generated by the texture generating part 214, it is possible to generate an avatar looking more like the actual one.

As is understood from the foregoing description, an avatar to be generated is an avatar generated so that at least a face thereof corresponds to (looks like) a subject person, and a person who sees the avatar can immediately identify the subject person represented by the avatar. Such an avatar is useful in a situation in which the subject person needs to be reliably identified from the avatar but the person does not want to show his/her complete real face. For example, the person can use, as necessary, an avatar generated from an image of the person captured after he/she has adjusted his/her appearance by shaving the beard or making up his/her face.

Variation 1

Figure 7:
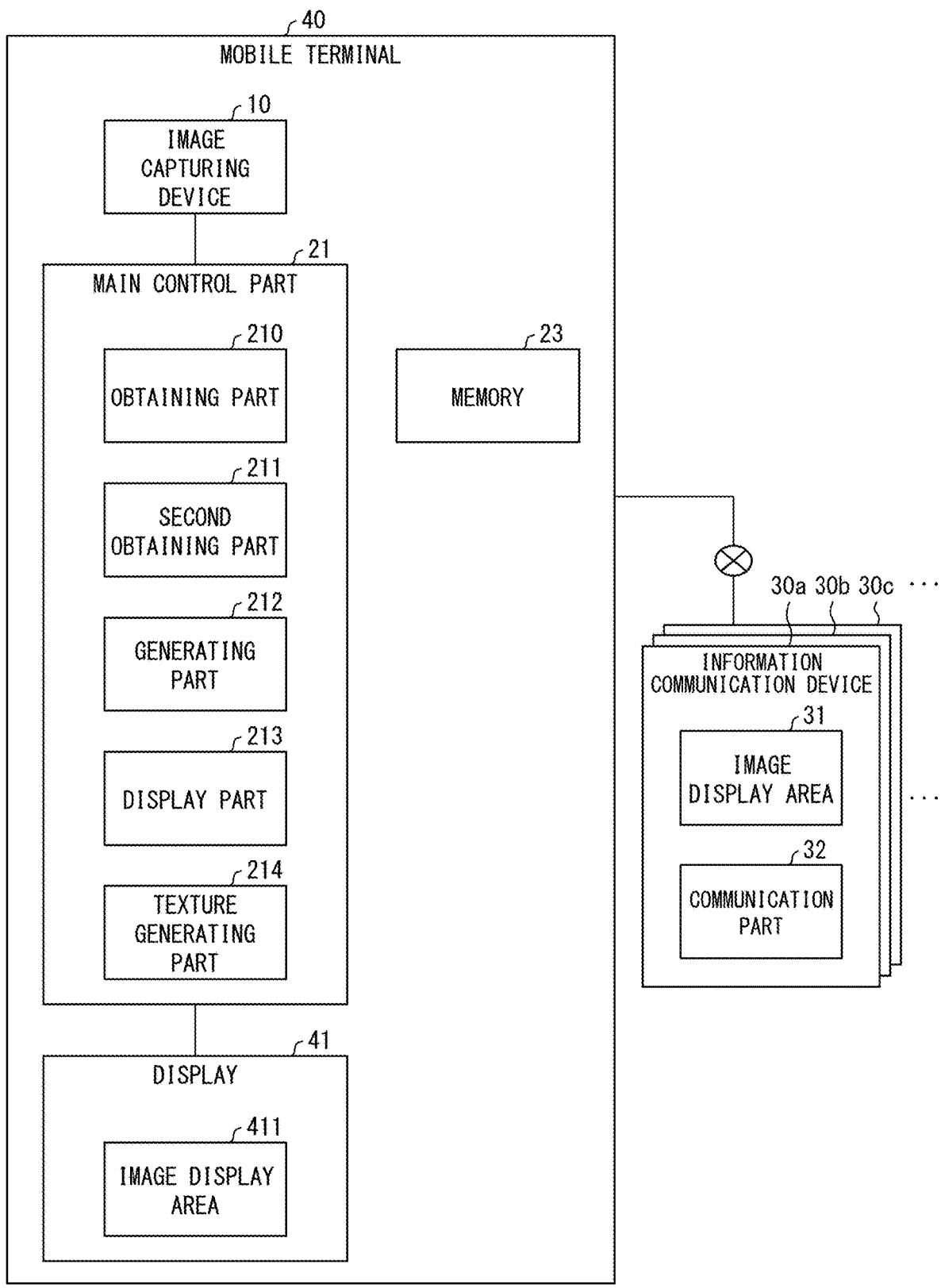
FIG. 7 is a block diagram of a mobile terminal in accordance with Variation 1 of Embodiment 1.

The above description of Embodiment 1 has dealt with the avatar display system 100 including the image capturing device 10, the avatar display device 20, and the information communication device 30, which are independent from each other. However, the present invention is not limited to such an arrangement. FIG. 7 is a block diagram of a mobile terminal 40 in accordance with Variation 1 of Embodiment 1. The mobile terminal 40 is an example of the information communication device, and is communicable with the information communication devices 30a, 30b, 30c, . . . .

The mobile terminal 40 may be a mobile phone or a tablet terminal that includes, e.g., an image capturing device 10 and that has a communication function. The mobile terminal 40 may include the image capturing device 10, a main control part 21, a memory 23, and a display 41. The image capturing device 10 has the functions described in Embodiment 1, and may be incorporated in the mobile terminal 40.

The display 41 is a display screen of the mobile terminal 40, and the display 41 may have an image display area 411. The image display area 411 is, for example, an area in which an image is to be displayed by an application included in the mobile terminal 40.

The main control part 21 may include an obtaining part 210, a second obtaining part 211, a generating part 212, a display part 213, and a texture generating part 214. The second obtaining part 211 may calculate depth data from captured image data. The generating part 212 may compose a 3D model in accordance with the depth data to generate an avatar, and may record the avatar in the memory 23. The display part 213 causes the avatar recorded in the memory 23 to follow an orientation of the person in a moving image, and may display, in the image display area 411 of the display 41 and the image display areas 31 of the information communication devices 30a, 30b, 30c, . . . , the avatar that is cause to follow a motion of the person. For example, the display part 213 may (i) replace, with the avatar that is caused to follow the motion of the person, a person in each frame image in a moving image captured by the image capturing device 10, (ii) combine the avatar that is caused to follow the motion of the person with a given still image or a given moving image, or (iii) generate data of the avatar that is caused to follow the motion of the person. The texture generating part 214 may generate texture data of the person in accordance with the captured image data. The function of the texture generating part 214 is as described in Embodiment 1. The main control part 21 may display, in the display 41, the data generated by the display part 213. Alternatively, the main control part 21 may transmit the data to the information communication devices 30a, 30b, 30c, . . . to display, in the image display areas 31 of the information communication devices 30a, 30b, 30c, . . . , the avatar that is caused to follow the motion of the person. The memory 23 is as described in Embodiment 1.

The mobile terminal 40 in accordance with Variation 1 realizes, by a single device, the image capturing device 10, the avatar display device 20, and the information communication device 30 in accordance with Embodiment 1.

In Variation 1, the mobile terminal 40 has the functions of the image capturing device 10, the avatar display device 20, and the information communication device 30 in accordance with Embodiment 1. However, the entity that has these functions is not limited to the mobile terminal 40. Alternatively, a desktop personal computer (PC) may have these functions.

As described above, in Variation 1, the mobile terminal 40 includes the image capturing device 10 therein, and serves also as the information communication device having the image display area 411. Recently, mobile terminals have enhanced performance, and various applications are available therewith. Thus, also with the mobile terminal having all the above-described functions, it is possible to attain effects similar to those given by the avatar display system 100 described in Embodiment 1. In addition, the user can easily display his/her avatar in a moving image with use of a mobile terminal.

Variation 2

Figure 8:
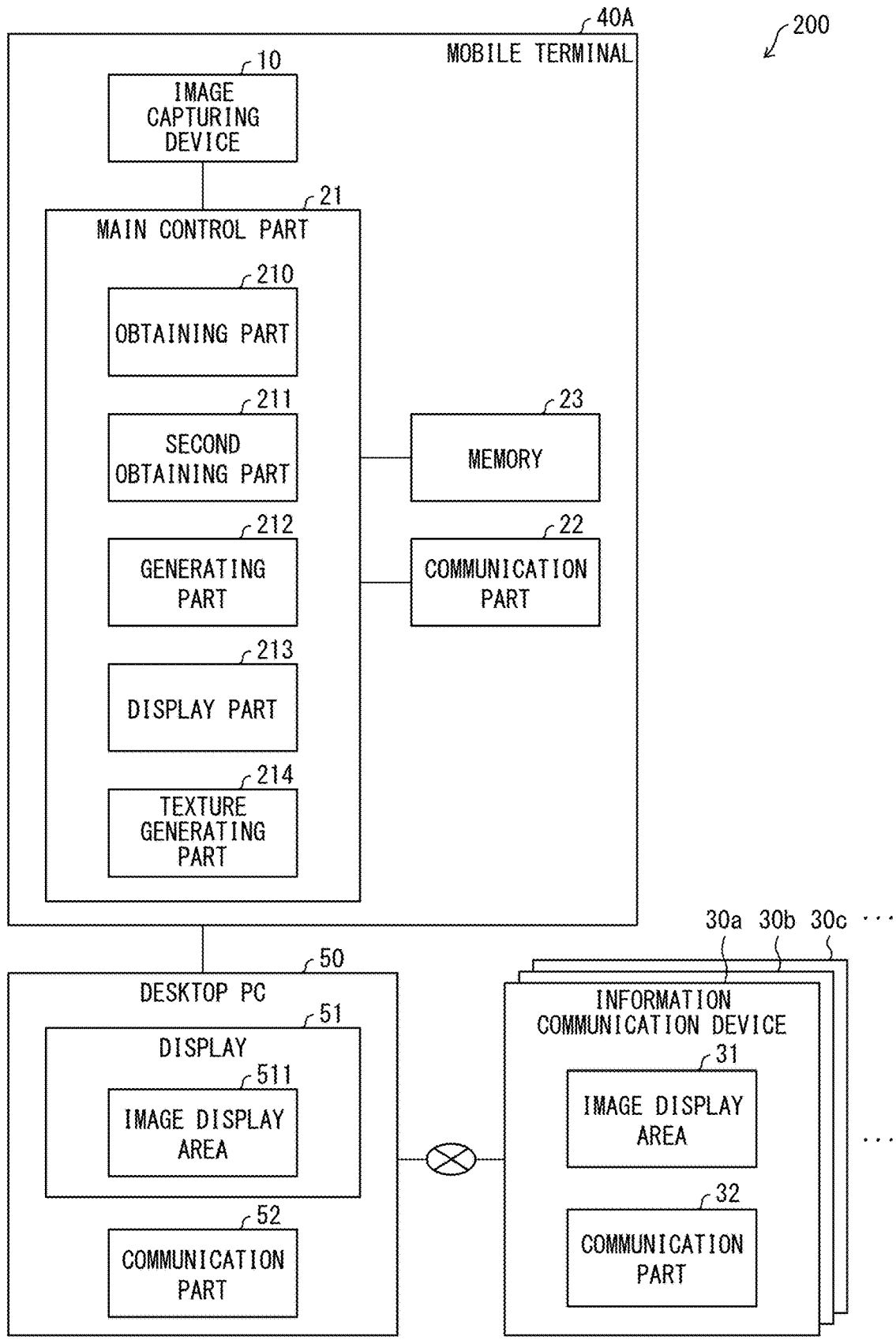
FIG. 8 is a block diagram of an avatar display system in accordance with Variation 2 of Embodiment 1.

The following will describe Variation 2 of Embodiment 1. FIG. 8 is a block diagram of an avatar display system 200 in accordance with Variation 2 of Embodiment 1. The avatar display system 200 may include a mobile terminal 40A and a desktop personal computer 50.

The mobile terminal 40A may include an image capturing device 10, a main control part 21, a communication part 22, and a memory 23. The main control part 21 may include an obtaining part 210, a second obtaining part 211, a generating part 212, a display part 213, and a texture generating part 214. The main control part 21 may transmit, to the desktop personal computer 50 via the communication part 22, avatar display data for use in displaying an avatar that is caused to follow a motion of a person. A configuration of the mobile terminal 40A is identical to the configuration of the mobile terminal 40 described in Variation 1, except that the mobile terminal 40A includes the communication part 22 and does not include the display 41.

The desktop personal computer 50 includes a display 51 and a communication part 52. The display 51 may include an image display area 511. The communication part 52 may receive avatar display data from the mobile terminal 40A. The desktop personal computer 50 may use the avatar display data received from the mobile terminal 40A to display, in the image display area 511 of the display 51, an avatar that is cased to follow a motion of the person. The desktop personal computer 50 is an embodiment of the information communication device 30 described in Embodiment 1.

Similarly to the mobile terminal 40 in accordance with Variation 1, the mobile terminal 40A may include the image capturing device 10, the obtaining part 210, the second obtaining part 211, the generating part 212, the display part 213, and the texture generating part 214. However, unlike the mobile terminal 40 in accordance with Variation 1, the mobile terminal 40A may display, in the display 51 of the desktop personal computer 50, an avatar that is caused to follow a motion of a person, instead of displaying that avatar in its own display.

As described above, the mobile terminal 40A may (i) generate the avatar display data for use in displaying of the avatar that is caused to follow the motion of the person and (ii) display, in the desktop personal computer 50, the avatar display data thus generated. Alternatively, the display part 213 may be included in the desktop personal computer 50, rather than in the mobile terminal 40A (not illustrated). With the above configuration, it is possible to achieve effects similar to those given by the avatar display system 100 described in Embodiment 1. In addition, the user can easily display, on a moving image in the desktop personal computer, his/her avatar with use of the mobile terminal.

Embodiment 2

The following description will discuss another embodiment of the present invention. For convenience of description, any members of Embodiment 2 that are identical in function to the members described for Embodiment 1 are assigned the same reference signs, and are not described again here.

Configuration of Mobile Terminal 40B

Figure 9:
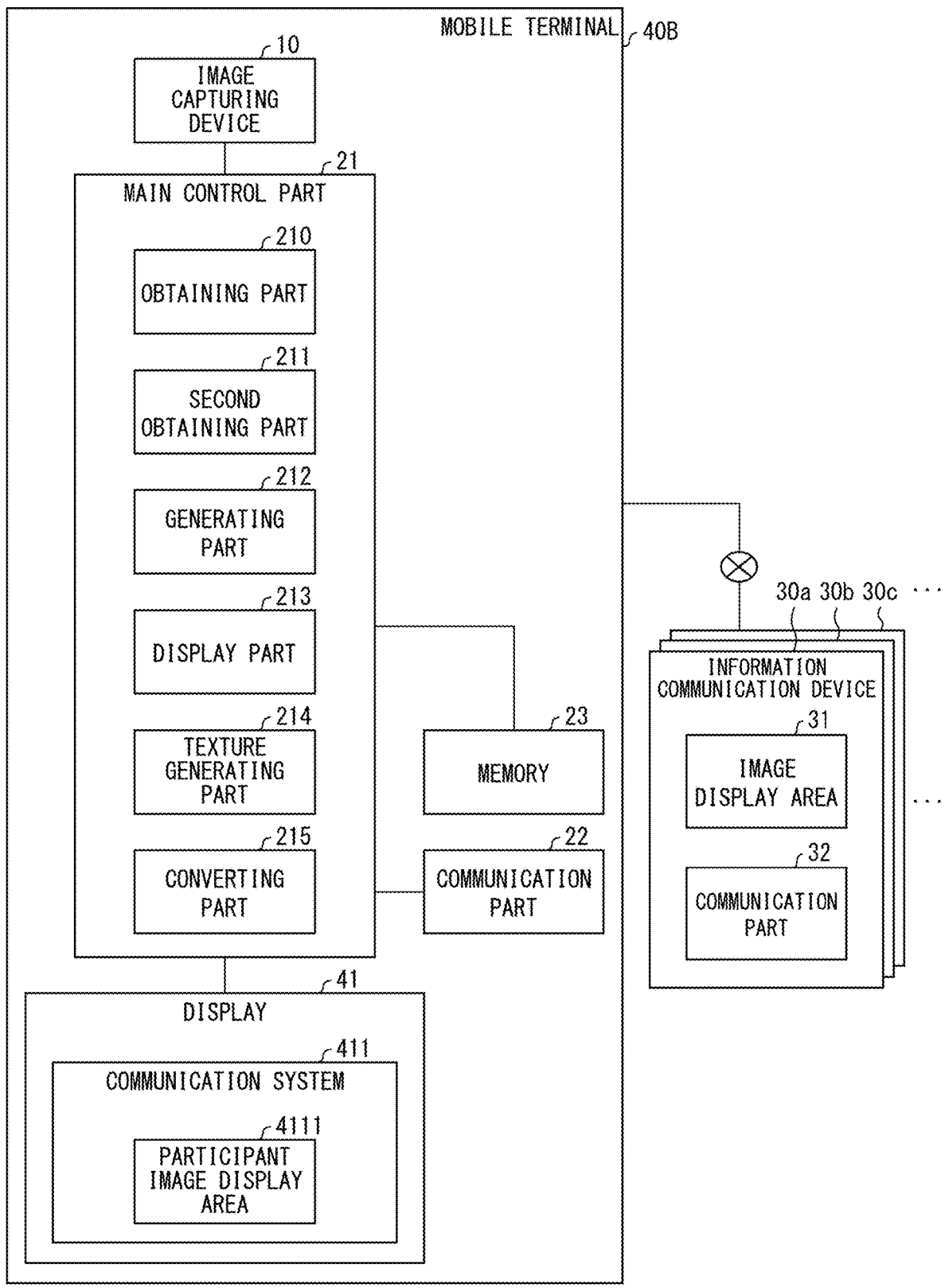
FIG. 9 is a block diagram illustrating a configuration of a mobile terminal in accordance with Embodiment 2 of the present invention.

FIG. 9 is a block diagram illustrating a configuration of a mobile terminal 40B in accordance with Embodiment 2 of the present invention. The mobile terminal 40B may include an image capturing device 10, a main control part 21, a memory 23, and a display 41. The main control part 21 may include an obtaining part 210, a second obtaining part 211, a generating part 212, a display part 213, a converting part 215, and a texture generating part 214. The image capturing device 10, the obtaining part 210, the second obtaining part 211, the generating part 212, the display part 213, the texture generating part 214, and the memory 23 are similar to those described in Embodiment 1.

Similarly to the mobile terminal 40, the mobile terminal 40B also serves as the information communication device 30 described in Embodiment 1. The mobile terminal 40B may include an application for a communication system involving use of a moving image. As described above, the moving image used in the communication system may be a two-dimensional image or a three-dimensional image. The communication system involving use of a moving image may be, for example, a teleconferencing system or a communication system in a virtual space (VR space) such as metaverse. The teleconferencing system is a system in which two or more persons carry out a meeting, a conference, a conversation, chatting, or the like via a mobile phone(s), a personal computer(s), a video-telephone(s), and/or the like over the Internet or a dedicated line, and may also be called a web meeting system or a video meeting system. The communication system involving use of a moving image used in Embodiment 2 can be carried out with use of a known application of any kind.

When the application for the communication system involving use of a moving image is started, the display 41 displays a communication system 411 (e.g., a meeting room in a teleconferencing system) involving use of a moving image, and a participant image display area 4111 is displayed therein. The participant image display area 4111 displays a participant(s) who participate(s) in the communication system involving use of a moving image. In Embodiment 2, the participant image display area 4111 displays images of users of the mobile terminal 40B and information communication devices 30a, 30b, 30c, . . . . The participant image display area 4111 corresponds to the image display area 31 described in Embodiment 1. The display part 213 may display, in the participant image display area 4111, an avatar(s) that is/are caused to follow a motion(s) of the participant(s).

Before start of a meeting, the user of the mobile terminal 40B may capture an image of himself/herself with the mobile terminal 40B. Then, the user may select a favorite one from among the images thus captured, and may cause the generating part 212 to generate an avatar. In one example, the user may select a head part or a head part area in the favorite image and tap an avatar generating button. In response to this, the generating part 212 generates, from the image of the selected area, an avatar of an upper-half body or a head part, and records the avatar in the memory 23.

Next, the user may designate, in the communication system involving use of a moving image, the participant image display area 4111 in which the user's image is to be displayed. Specifically, for example, the user may enter or select his/her name or ID to be displayed in the image. Note that entry or selection of the other participant's name or ID is prohibited.

In an aspect, the display part 213 may replace the upper-half body, the whole body, or the head part of a user in a moving image captured by the image capturing device 10 with an avatar that is caused to follow a motion of the upper-half body, the whole body, or the head part of the user. The main control part 21 may display, in the participant image display area 4111, the moving image in which the user's image is replaced with avatar. In addition, the main control part 21 may transmit the image in which the user's image is replaced with the avatar to the information communication device(s) used by the other participant(s) via the application for the communication system involving use of a moving image.

In another aspect, the converting part 215 may convert a data format of the avatar generated by the generating part 212. Specifically, the converting part 215 may convert the data format of the avatar so that the data format is compatible with an image data format of the application used by the mobile terminal 40B. An image data format available in an application for the teleconferencing system may vary depending on the application. In such a case, the converting part 215 may convert the data format (e.g., VRM format) of the avatar into a data format available in the application. With this, it is possible to display the avatar, regardless of the kind of the communication system involving use of a moving image. The following description will discuss, with reference to the drawings, an avatar display method S2 for converting a data format of an avatar.

Figure 10:
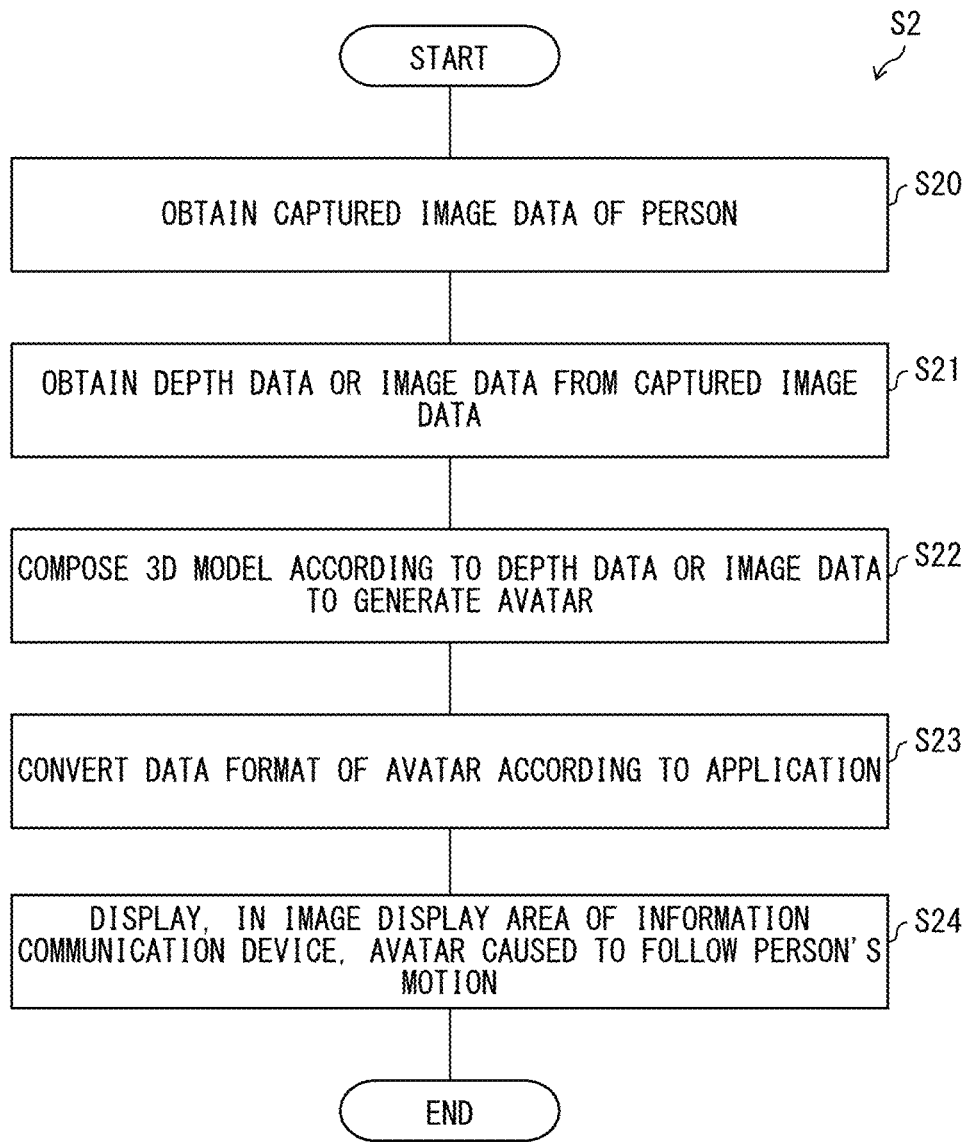
FIG. 10 is a flowchart illustrating a flow of an avatar display method in accordance with Embodiment 2.

FIG. 10 is a flowchart illustrating a flow of the avatar display method S2 to be executed by the mobile terminal 40B. The avatar display method S2 includes the following steps. First, in step S20, the image capturing device 10 may capture an image of a person and generate captured image data. The obtaining part 210 of the avatar display device 20 may obtain, via the communication part 22 and the communication part 11, the captured image data generated by the image capturing device 10.

Then, in step S21, the second obtaining part 211 may obtain (calculate) depth data of the person from the captured image data obtained by the obtaining part 210. As will be described later, the second obtaining part 211 may obtain image data of the person from the captured image data. Then, in step S22, the generating part 212 composes a 3D model in accordance with the depth data calculated by the second obtaining part 211 so as to generate an avatar. The generating part 212 may record, in the memory 23, the avatar thus generated.

Then, in step S23, the converting part 215 may convert the data format of the avatar in accordance with the application of the communication system involving use of a moving image and that is used by the mobile terminal 40B. Subsequently, in step S24, the display part 213 may display, in the participant image display area 4111 of the display 41 of the mobile terminal 40B (information communication device), the avatar that is caused to follow a motion of the person. In addition, the display part 213 may transmit the avatar in the converted data format to the information communication devices 30a, 30b, 30c, . . . via the communication part 22, and may display the avatar in the image display areas 31 (participant image display areas) of the information communication devices 30a, 30b, 30c, . . . .

With the mobile terminal 40B and the avatar display method S2 in accordance with Embodiment 2 configured as above, it is possible to display an avatar of a user in the communication system involving use of a moving image (e.g., a teleconferencing system). With this, it is possible to achieve effects similar to those given by Embodiment 1. Particularly, in a case of using the teleconferencing system, in which the person who is speaking needs to be clearly identified, the following merits can be achieved. That is, since an avatar in accordance with Embodiment 2 is generated in accordance with a user's image, it is possible to clearly identify a user represented by the avatar. In addition, since an avatar in accordance with Embodiment 2 is made to look like the user, the other participant(s) would not have a great strange feeling even if the user's real face is not shown. Furthermore, thanks to the converting part 215 included in the configuration of Embodiment 2, even an application that requires a different data format can be made available.

Note that the converting part 215 described in Embodiment 2 can be combined with Embodiment 1.

Embodiment 3

The following description will discuss another embodiment of the present invention. For convenience of description, any members of Embodiment 3 that are identical in function to the members described for Embodiments 1 and 2 are assigned the same reference signs, and are not described again here.

Figure 11:
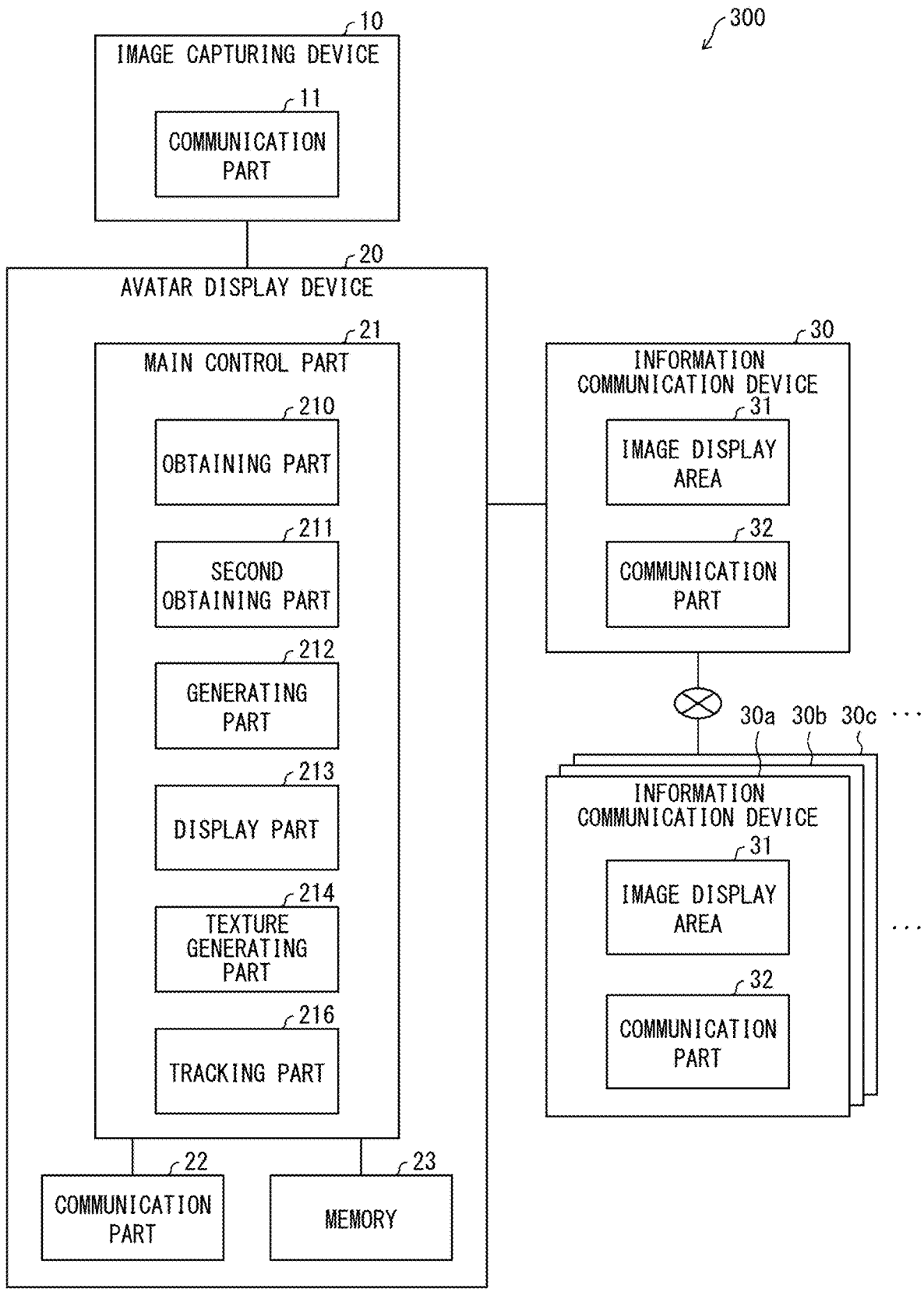
FIG. 11 is a block diagram illustrating a configuration of an avatar display system in accordance with Embodiment 3 of the present invention.

FIG. 11 is a block diagram illustrating a configuration of an avatar display system 300 in accordance with Embodiment 3 of the present invention. The avatar display system 300 includes an image capturing device 10, an avatar display device 20, and an information communication device 30. The image capturing device 10 and the information communication device 30 are similar to the devices described in Embodiment 1. Therefore, descriptions of the image capturing device 10 and the information communication device 30 are omitted.

The avatar display device 20 may include a main control part 21, a communication part 22, and a memory 23. The main control part 21 may include an obtaining part 210, a second obtaining part 211, a generating part 212, a display part 213, a texture generating part 214, and a tracking part 216. The obtaining part 210, the second obtaining part 211, the generating part 212, the display part 213, and the texture generating part 214 are similar to those described in Embodiment 1. The tracking part 216 may track a face of a person in an image obtained by the image capturing device 10. Furthermore, the tracking part 216 may track a neck of the person in the image. The tracking refers to detection of a position. The display part 213 may cause, with reference to an orientation of the face tracked, an avatar to follow a motion of the person. In a case where the tracking part 216 tracks the neck of the person, the display part 213 may cause, with reference to the orientation of the neck tracked, the avatar to follow a motion of a body part of the person which body part includes the neck and a part lower than the neck. A specific operation therefor will be described below.

The generating part 212 may generate, from the image obtained by the image capturing device 10, not only a head part model of the person but also a model of a body part including a neck of the person and a part lower than the neck. The body part including the neck of the person and the part lower than the neck is, for example, an upper-half body not including the head part. Hereinafter, in Embodiment 3, the body part including the neck of the person and the part lower than the neck may simply be referred to as a "body part". The body part does not need to be made to look like the person as the face model is. For example, the body part model may an existing body part model. For example, the body part model may be the one generated by excluding a head part from an existing upper-half body model.

The tracking part 216 may track (pursue), e.g., eyes of the face of the person. The tracking of a certain subject in an image can be carried out with use of a known program or a known application. A subject to be tracked may be any of eyes, a nose, and a mouth. The tracking part 216 may work out an orientation of the face from the shapes and arrangement of the two eyes tracked. A method for working out the orientation of the face is similar to the method for determining the orientation of the face described in Embodiment 1.

The tracking part 216 may track the face of the person as well as the neck of the person. The neck is recognized as, for example, a cylindrical area extending downward from the face. The tracking part 216 may work out the orientation of the neck tracked. The orientation of the neck refers to any of directions (front, rear, left, and right) toward which the neck is bent. In other words, the orientation of the neck refers to a direction toward which the neck is inclined. The orientation of the neck is determined in the following manner That is, when the neck is inclined toward the left or right, it is determined that the body part is inclined toward the left or right at an angle of that time. Meanwhile, when a ratio in width between an upper part of the neck and a lower part of the neck changes, it is determined that the body part is inclined toward the front or rear at a given angle in accordance with the ratio.

The purpose of tracking the neck is to process the head part and the body part of the avatar individually. Specifically, the generating part 212 may separately generate the model of the head part of the person and the model of the body part including the neck of the person and the part lower than the neck. The head part moves independently of the body part. Meanwhile, the orientation of the neck changes in conjunction with the orientation of the body part. For example, in a case where the neck is inclined toward the right, the body part is considered to be inclined toward the right. Thus, the display part 213 may move the head part of the avatar in accordance with a result of tracking of the eyes, nose, and mouth of the person, and may move the body part of the avatar with reference to the orientation of the neck of the person. With this, it is possible to display the avatar in a motion more looking like an actual one.

Moving the head part of the avatar means the following operation: the display part 213 changes the orientation of the head part model generated by the generating part 212 so that the head part model follows the orientation of the face worked out by the tracking part 216 and displays the head part model in the image display area(s) 31 of at least one of the information communication devices 30, 30a, 30b, 30c, . . . . Moving the body part of the avatar means the following operation: the display part 213 changes the orientation of the body part model generated by the generating part 212 so that the body part model follows the orientation of the neck worked out by the tracking part 216 and displays the body part model in the image display area(s) 31 of at least one of the information communication devices 30, 30a, 30b, 30c, . . . . The display part 213 may generate a head part model or a body model whose orientation has been changed.

Alternatively, the display part 213 may generate motion data that gives an instruction to change the orientation of the head part model or the body model.

In order to display twisting of the body part of the avatar, for example, the shoulder part may be tracked so that the position and orientation thereof are detected, and accordingly the body part model may be twisted. The arms and legs move independently of the body part. Thus, in order to generate an avatar including the arms and legs, the positions and orientations of the arms and legs may be tracked in the image, and orientations of models of arms and legs additionally generated may be changed.

Avatar Display Method S3

Next, the following description will discuss, with reference to the drawings, an avatar display method S3 to be executed by the avatar display system 300 in accordance with Embodiment 3. FIG. 12 is a flowchart illustrating a flow of the avatar display method S3 to be executed by the avatar display system 300. Note that, in an example described here, the avatar display method S3 displays an avatar including both a head part and a body part.

The avatar display method S3 includes the following steps. First, in step S31, the obtaining part 210 may obtain captured image data of a person which captured image data is obtained by the image capturing device 10. In step S32, the tracking part 216 may track eyes, a nose, and a mouth of the person on the basis of the captured image data obtained by the obtaining part 210. The tracking of the eyes, nose, and mouth of the person may be carried out in accordance with depth data or image data obtained from the captured image data.

In step S33, the display part 213 may move the head part of the avatar in accordance with a result of tracking of the eyes, nose, and mouth of the person. The display part 213 may move the body part of the avatar with reference to an orientation of a neck of the person tracked. In other words, the display part 213 may move the avatar by generating avatar display data for use in displaying the avatar that is caused to follow motions of a head part and a body part of the person in the moving image. The moving image in which the avatar moves is displayed in the image display area 31.

With the avatar display device 20 and the avatar display method S3 in accordance with Embodiment 3 configured as above, a head part model and a body part model of a person may be separately generated, the head part of an avatar may be moved in accordance with a result of tracking of eyes, a nose, and a mouth, and the body part of the avatar may be moved with reference to an orientation of a neck of the person. With this, it is possible to independently move the head part and the body part of the avatar. Thus, it is possible to achieve the effects given by Embodiment 1 or 2 as well as an effect of being capable of displaying an avatar that more faithfully reflects a motion of a person.

Note that the tracking part 216 described in Embodiment 3 can be combined with Embodiment 1 or 2.

Embodiment 4

The following description will discuss another embodiment of the present invention. For convenience of description, any members of Embodiment 4 that are identical in function to the members described for Embodiments 1 to 3 are assigned the same reference signs, and are not described again here.

An avatar generating device in accordance with Embodiment 4 includes: an obtaining part that obtains captured image data of a person; a second obtaining part that calculates depth data of the person from the captured image data; a generating part that composes a 3D model in accordance with the depth data to generate to generate an avatar; and an output part that outputs the avatar thus generated. The generating part is similar to the generating part 212 described in Embodiments 1 to 3 described above. The output part is similar to the communication part 22 described in Embodiments 1 to 3 described above. Note that the avatar generating device may include a memory that records therein an avatar generated by the generating part. The memory is similar to the memory 23 described in Embodiments 1 to 3 described above.

An avatar generated by the avatar generating device in accordance with Embodiment 4 can be output externally via the output part. For example, the avatar generating device may output the avatar to a virtual space. Examples of the virtual space encompass: a virtual reality space (e.g., VRChat (registered trademark)) a whole of which is constituted by a computer graphics image and which is called "virtual reality (VR)"; an augmented reality space which is a combination of a real space and a computer graphics image and which is called "augmented reality (AR)"; and a mixed reality space which is made of a real space and virtual information and/or the like that are overlaid and which is called "mixed reality (MR)". For example, there is a virtual space in which a user can participate via the Internet. For another example, there is a virtual space displayed by a given display device (e.g., a display, a viewer). Outputting an avatar to a virtual space means displaying an avatar in a virtual space such as that listed above.

In order to output an avatar to a virtual space, a data format of the avatar may need to be changed in accordance with the format of the virtual space in some cases. For this purpose, the avatar generating device may include the above-described converting part 215.

With the avatar generating device configured as above, a user can generate his/her avatar and display the avatar in various virtual spaces.

Embodiment 5

The following description will discuss another embodiment of the present invention. For convenience of description, any members of Embodiment 5 that are identical in function to the members described for Embodiments 1 to 4 are assigned the same reference signs, and are not described again here. Each of the embodiments described below is applicable to each of Embodiments 1 to 4 described above.

The image capturing device 10 described in Embodiments 1 to 4 may employ a color film to obtain color data of a person. In this case, the generating part 212 can use depth data and color data to generate an avatar. That is, the generating part 212 can add, to the avatar, hue of the face, hair, clothing, and/or the like of the person.

Embodiment 6

The following description will discuss another embodiment of the present invention. For convenience of description, any members of Embodiment 6 that are identical in function to the members described for Embodiments 1 to 5 are assigned the same reference signs, and are not described again here. Each of the embodiments described below is applicable to each of Embodiments 1 to 5 described above.

The avatar described in each of Embodiments 1 to 5 can be caused to follow not only an orientation of a person but also a facial expression of the person.

In an aspect, the display part 213 may detect a feature point in a face of a person from captured image of the person which captured image is captured by the image capturing device 10. The display part 213 may detect, for example, one or more feature points of eyes and/or a part(s) around the eyes, one or more feature points of a nose and/or a part(s) around the nose, and one or more feature points of a mouth and/or a part(s) around the mouth. The one or more feature points of the eyes and/or the part(s) around the eyes may include a feature point corresponding to an eyebrow. The one or more feature points of the mouth and/or the part(s) around the mouth may include a feature point corresponding to a jaw.

The number of feature points in the face of the person that are to be detected to follow a facial expression may be smaller than the number of feature points in the face of the person that are to be detected to generate an avatar. As the number of feature points to be detected increases, it is possible to express a facial expression of the person more accurately. However, as the number of feature points increases, information processing takes longer. This may cause delay in generation of a facial expression of the avatar, thereby making it difficult to display the avatar on a real-time basis. In order to deal with this, the number of feature points for expressing the facial expression is reduced. This enables quick information processing, thereby making it possible to generate an avatar with a lot of facial expressions on a real-time basis. The feature points in the face of the person that are to be detected to follow the facial expression may be, for example, the ones illustrated in FIG. 16.

In accordance with how the coordinates of the detected feature points have been changed from those at the time of generation of the avatar, the display part 213 can deform a face model of the avatar so as to cause a facial expression of the avatar to follow a facial expression of the person. Carrying out this process in accordance with the change in the coordinates of the feature points of the eyes and/or the part(s) around the eyes, the nose and/or the part(s) around the nose, and the mouth and/or the part(s) around the mouth makes it possible to deform the shapes of the eyes, nose, and mouth of the avatar in accordance with the facial expression of the person, thereby making it possible to cause the facial expression of the avatar to follow the facial expression of the person. For example, in the process for generating the face model of the avatar, the generating part 212 may carry out the following. That is, the generating part 212 may record, from among the feature points in the face of the person that are detected to generate the avatar, the coordinates of the feature points in the face of the person that are detected to follow the facial expression so that the coordinates of the feature points in the face of the person that are detected to follow the facial expression are associated with a face model. Then, in accordance with a difference between (i) the coordinates of the feature points associated with the face model and (ii) coordinates of detected feature points, the display part 213 may deform the face model with use of a known algorithm such as a blend shape technique. With this, the display part 213 can cause a facial expression of the avatar to follow a facial expression of the person on a real-time basis.

Some facial expressions of the person show a part(s) (e.g., a tongue, a tooth) of the face which part(s) did not appear at the time of generation of the avatar. In order to deal with this, for a part(s) (e.g., a tongue, a tooth) of a face not appearing in a general situation, the generating part 212 may prepare a 3D model part(s) and combine the 3D model part(s) into the avatar, for example.

In an aspect, the display part 213 may reflect, in a facial expression of the avatar, a facial expression designated by the user. For example, in a case where the person has an angry expression, the avatar may be made to have a smile expression. In this case, the display part 213 fixes (does not deform) only the feature points for making smile (e.g., the feature points of the mouth and/or the part(s) around the mouth) and changes the other feature points in accordance with the coordinates of the detected feature points. This makes it possible to express a smile expression even when the person is angry.

There may be a case where a character other than a human is used as an avatar. In such a case, feature points in a face of the character may be associated with feature points in a face of a person in advance. Consequently, a facial expression of the person can be reflected in a facial expression of the character. In this manner, a facial expression of a user can be reflected even in a character other than a human.

In another aspect, the display part 213 may use, e.g., templates such as images 361*a* to 361*h* shown in FIG. 13 to cause a facial expression of an avatar to follow a facial expression of a person. For example, the display part 213 may carry out image analysis on a facial expression of the person in the captured image. Then, if it is determined that the facial expression looks like one of the images 361*a* to 361*h*, the facial expression of the avatar may be caused to follow the one image.

Embodiment 7

The following description will discuss another embodiment of the present invention. For convenience of description, any members of Embodiment 7 that are identical in function to the members described for Embodiments 1 to 6 are assigned the same reference signs, and are not described again here. Each of the embodiments described below is applicable to each of Embodiments 1 to 6 described above.

Figure 14:
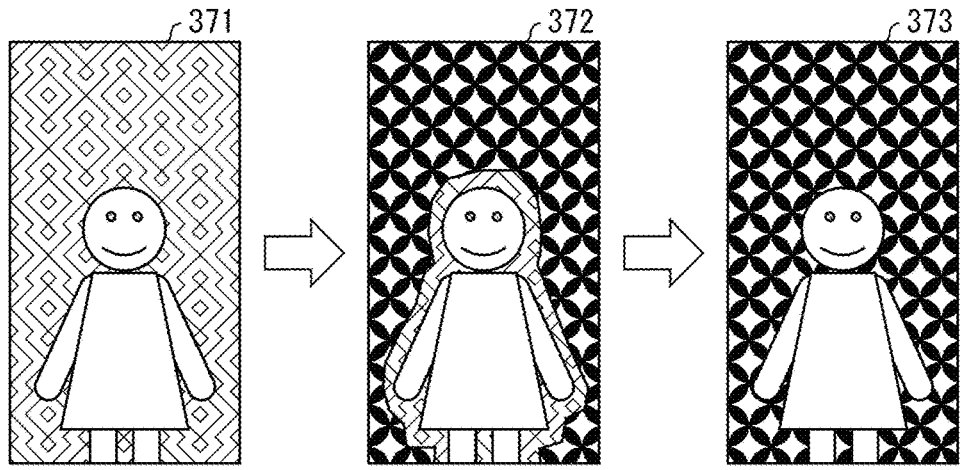
FIG. 14 is a conceptual view illustrating a procedure for replacing a background and a person in a moving image with other ones.

In each of Embodiments 1 to 6 described above, only the upper-half body or the head part of the person in the moving image is displayed in the avatar, and the background is displayed without any modification. Alternatively, however, the background in the moving image may be replaced with another image and the moving image including the replaced background may be displayed. FIG. 14 shows a procedure for this case. An image 371 shown in FIG. 14 is an original image. In order to replace the background in this image with a desired background shown in an image 373, a part of the background is cut away along an outline of a person, as shown in the image 372. The outline of the part to be cut away may be a rough outline that is slightly separated outwardly from the actual outline of the person. Then, an avatar of the person is put into the cut area, and the avatar and the background are smoothly blended in a gap therebetween. This procedure enables the replacement that yields an image including the desired background and the avatar, as in an image 373.

Embodiment 8

The following description will discuss another embodiment of the present invention. For convenience of description, any members of Embodiment 8 that are identical in function to the members described for Embodiments 1 to 7 are assigned the same reference signs, and are not described again here. Each of the embodiments described below is applicable to each of Embodiments 1 to 7 described above.

In each of Embodiments 1 to 7 described above, the face of the avatar is made to look like the face of the person as much as possible. However, parts other than the face do not need to be made to look like corresponding parts of the person. For example, the hairstyle of the avatar may be changed. For another example, an accessory (e.g., a necklace, eye glasses) may be added to the avatar. For still another example, an avatar of a person may be generated so that a body part other than a head part may be replaced with a body part of a body shape different from that of the person.

Embodiment 9

The following description will discuss another embodiment of the present invention. For convenience of description, any members of Embodiment 9 that are identical in function to the members described for Embodiments 1 to 8 are assigned the same reference signs, and are not described again here. Each of the embodiments described below is applicable to each of Embodiments 1 to 8 described above.

Each of the descriptions in Embodiments 1 to 8 has dealt with the example in which the avatar display device 20 calculates depth data from captured image data of a person (user), and composes a 3D model of the person in accordance with the depth data to generate an avatar. However, the data for use in generation of the avatar is not limited to the depth data. For example, an avatar may be generated from image data. The description in Embodiment 9 will discuss a configuration in which a second obtaining part 211 obtains image data from captured image data, and a generating part 212 composes a 3D model in accordance with the image data to generate an avatar.

The image data may be, for example, an RGB image data. However, this is not limitative.

Figure 15:
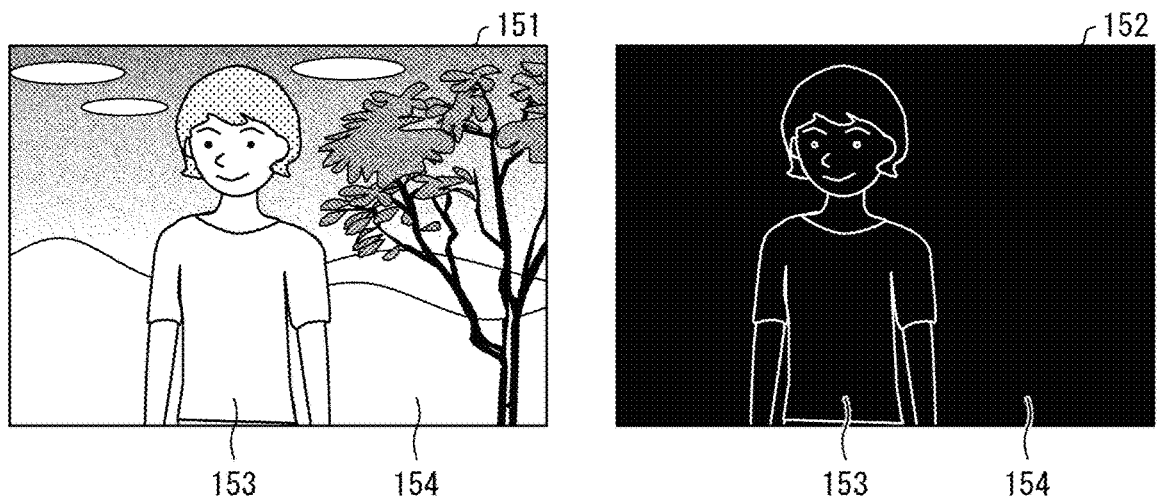
FIG. 15 is a conceptual view illustrating an example of a result of extracting an outline of a person from captured image data.

First, the second obtaining part 211 may extract image data of a person from captured image data. In one example, the second obtaining part 211 may use a known edge detection algorithm to extract an outline from captured image data, and accordingly discriminate a person from a background in the captured image data. Then, the second obtaining part 211 extracts image data of the person. FIG. 15 is a conceptual view illustrating an example of a result of extracting an outline of a person from captured image data. A left image 151 in FIG. 15 shows one example of captured image data, and includes a person 153 and a background 154. A right image 152 in FIG. 15 shows one example of an image including an outline that the second obtaining part 211 has extracted from the image 151. The second obtaining part 211 removes, in accordance with the image 152, a part outside an outline of a largest object, thereby removing the background 154 from the image 151. Consequently, the second obtaining part 211 can obtain image data of the person 153.

Figure 16:
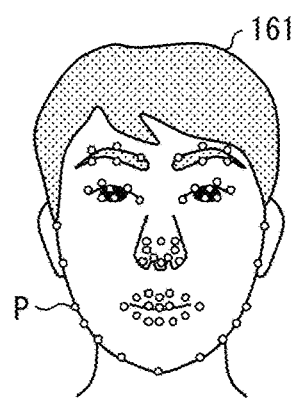
FIG. 16 is a conceptual view illustrating an example of a result of extracting, from image data, feature points in a face of a person.
Figure 17:
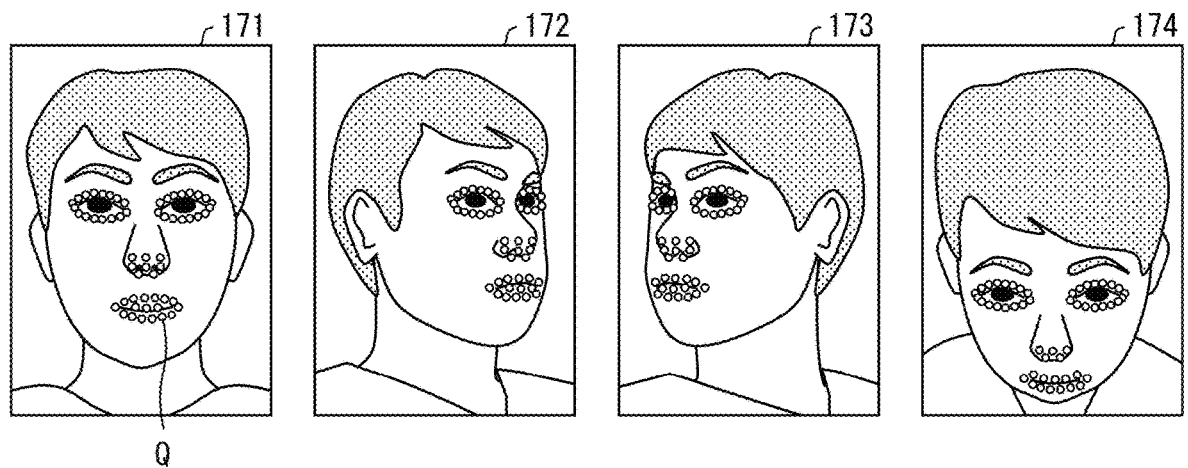
FIG. 17 is a conceptual view illustrating an example of a result of extracting, from image data, feature points corresponding to eyes, a nose, and a mouth in a face of a person.

Then, the generating part 212 may obtain a feature point(s) from the image data of the person. In one example, the generating part 212 may use a known feature point detection algorithm to detect the feature point(s) in the face of the person. FIG. 16 is a conceptual view illustrating an example of a result of detecting, from image data of a person 161, feature points P in a face of the person 161. In one example, the generating part 212 can detect, from the detected feature points P in the face of the person 161, arrangement of eyes, a nose, and a mouth in the face of the person 161 as well as a size of the face. FIG. 17 is a conceptual view illustrating an example of a result of extracting, from various pieces of image data including the person in different orientations, feature points Q of eyes, a nose, and a mouth of a person. The generating part 212 can extract the feature points Q of the eyes, nose, and mouth in the face of the person not only from an image 171 of the person facing forward but also from images 172 to 174 of the person facing various directions in a similar manner to that described above.

Here, the following will describe a tracking template. The tracking template is a template used to pursue (track) an orientation of a face of a person. The tracking template indicates various kinds of reference arrangement of feature points Q of eyes, a nose, and a mouth in a face of a person, and the various kinds of reference arrangement are respectively associated with various orientations of the face of the person. For example, the tracking template can be generated by the following manner involving use of images of various persons (persons of various races may be included) in various orientations. That is, feature points Q of eyes, noses, and mouths of the various persons in these images are detected in the above-described manner, and machine learning is carried out with use of the feature points Q thus detected. From an image of a person whose orientation is to be tracked, feature points of eyes, a nose, and a mouth may be detected and the detected feature points may be compared with the tracking template. With this, it is possible to estimate an orientation of the face of the person.

Here, in order to generate an avatar of a person, the generating part 212 may use any of the references in the tracking template to obtain information of feature points Q of eyes, a nose, and a mouth in a face of the person. For example, when the feature points Q of the eyes, nose, and mouth are detected from the images 171 to 174, the feature points Q thus detected may be compared to arrangement indicated as a reference by the tracking template generated in advance, so that differences in arrangement and size between the feature points Q of the eyes, nose, and mouth of the person and the reference can be obtained. Then, in accordance with the information (differences in arrangement and size from the reference) of the feature points Q of the eyes, nose, and mouth thus obtained, the generating part 212 may generate a 3D model of a front side part of the face of the person.

A method for generating a 3D model of the face in accordance with the information (the differences in arrangement and size from the reference) of the feature points Q of the eyes, nose, and mouth is not limited to any particular one. For example, the generating part 212 may generate a 3D model of the face with use of a learning model constructed by machine learning that uses, as teaching data, combinations of (i) 3D models of various faces and (ii) pieces of information (differences in arrangement and size from the reference) of feature points Q of eyes, noses, and mouths of these 3D models.

Figure 18:
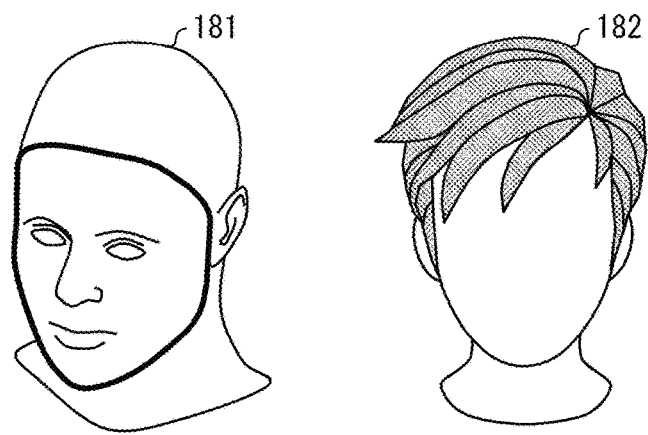
FIG. 18 is a conceptual view illustrating (i) an example of a 3D model of a front side part of a face and (ii) an example of a 3D model of a head part not including the front side part of the face.

FIG. 18 is a conceptual view illustrating (i) an example of a 3D model of a front side part of a face and (ii) an example of a 3D model of a head part not including the front side part of the face. The generating part 212 may generate the 3D model of the head part by merging, with a 3D model 181 of a front side part of a face generated in accordance with feature points Q of eyes, a nose, and a mouth of a person, a 3D model 182 of a head part including hair stored in a memory 23 in advance, for example. The generating part 212 may merge the two 3D models with each other together with, e.g., adjustment of the sizes of the 3D models, calibration (correction of distortion in an image caused by an angle), and/or morphing (image processing for smoothing a seam between the two 3D models).

Furthermore, similarly to Embodiment 1, the generating part 212 may merge, with the head part model, an upper-half body model or a another body part model and/or texture that is generated in accordance with captured image data. An avatar generated by the generating part 212 in this manner may be displayed by a display part 213, similarly to Embodiment 1. The display part 213 may use the above-described tracking template to detect an orientation of a face of a person, and may cause an orientation of the face of the avatar to follow the orientation of the face of the person. The display part 213 may detect a given feature point(s) in the face of the person, and may cause a facial expression of the avatar to follow a facial expression of the person.

As described above, the avatar display device 20 may use, in place of or in addition to depth data of a person, image data of the person to generate an avatar of the person. That is, the second obtaining part 211 may obtain the depth data or image data of the person. This also applies to any of the avatar display devices and avatar generating devices in accordance with Embodiments 1 to 5 described above.

Hardware Configuration and Software Implementation Example

Control blocks of the avatar display device 20 and the mobile terminals 40, 40A, and 40B (particularly, the parts included in the main control part 21 and the like; hereinafter, referred to as "avatar display device and the like") can be realized by a logic circuit (hardware) provided in an integrated circuit (IC chip) or the like or can be alternatively realized by software as executed by a central processing unit (CPU). In the latter case, the avatar display device and the like may be made of a computer (electronic computer) such as that illustrated in FIG. 19.

Figure 19:
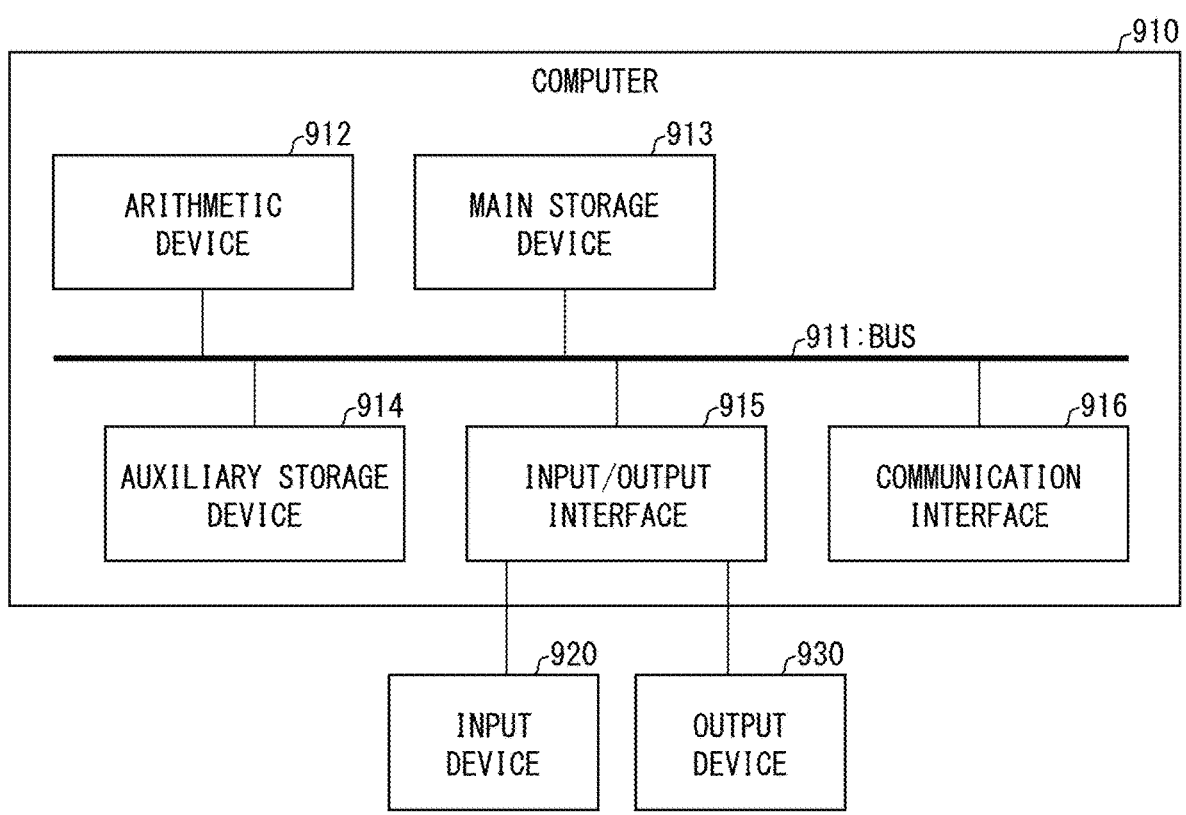
FIG. 19 shows an example of a configuration in which each part of an avatar display device and the like is realized by a computer.

FIG. 19 is a block diagram illustrating an example of a configuration of a computer 910 usable as an avatar display device. The computer 910 includes an arithmetic device 912, a main storage device 913, an auxiliary storage device 914, an input/output interface 915, and a communication interface 916 which are connected to each other via a bus 911. Each of the arithmetic device 912, the main storage device 913, and the auxiliary storage device 914 can be, for example, a central processing unit (CPU), a random access memory (RAM), a solid state drive, or a hard disk drive. The input/output interface 915 is connected with (i) an input device 920 via which a user inputs various information to the computer 910 and (ii) an output device 930 via which the computer 910 outputs various information to the user. The input device 920 and the output device 930 can be incorporated into the computer 910 or can be devices which are (externally) connected to the computer 910. For example, the input device 920 can be a button, a keyboard, a mouse, a touch sensor, or the like, and the output device 930 can be a lamp, a display, a printer, a speaker, or the like. Alternatively, it is possible to employ a device having functions of both the input device 920 and the output device 930, such as a touch panel in which a touch sensor and a display are integrated. The communication interface 916 is an interface via which the computer 910 communicates with an external device.

The auxiliary storage device 914 stores an information processing program for causing the computer 910 to function as the avatar display device and the like. The arithmetic device 912 loads, on the main storage device 913, the information processing program stored in the auxiliary storage device 914, and executes a command included in the information processing program so that the computer 910 functions as each part of the avatar display device and the like. Note that a storage medium which is included in the auxiliary storage device 914 for recording information such as the information processing program only needs to be a computer-readable "non-transitory tangible medium" and can be, for example, a tape, a disk, a card, a semiconductor memory, a programmable logic circuit, or the like.

Alternatively, a program recorded in a storage medium outside the computer 910 or a program supplied to the computer 910 via any transmission medium (e.g., a communication network or a broadcast wave) can be used to function the computer 910 in the above-described way. The present invention can also be achieved in the form of a computer data signal in which the above-described program is embodied via electronic transmission and which is embedded in a carrier wave.

ADDITIONAL REMARKS

Parts of the invention described herein can be described as in the additional remarks below. However, the present invention is not limited to the followings.

Additional Remarks 1

An avatar display device includes: an obtaining part that obtains captured image data of a person; a second obtaining part that obtains, from the captured image data, depth data or image data of the person; a generating part that composes a 3D model in accordance with the depth data or image data to generate an avatar; and a display part that displays, in an image display area of an information communication device, the avatar that is caused to follow a motion of the person.

Additional Remarks 2

An avatar generating device includes: an obtaining part that obtains captured image data of a person; a second obtaining part that obtains, from the captured image data, depth data or image data of the person; a generating part that composes a 3D model in accordance with the depth data or image data to generate an avatar; and an output part that outputs the avatar thus generated.

Additional Remarks 3

A program causes at least one processor to execute: an obtaining process for obtaining captured image data of a person; a second obtaining process for obtaining, from the captured image data, depth data or image data of the person; a generating process for composing a 3D model in accordance with the depth data or the image data to generate an avatar; and a display process for displaying, in an image display area of an information communication device, the avatar that is caused to follow a motion of the person.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

10: Image capturing device
11, 22, 32, 52: Communication part
20: Avatar display device 21: Main control part
211: Second obtaining part
212: Generating part
213: Display part
215: Converting part
216: Tracking part
23: Memory
30: Information communication device
31, 411, 511: Image display area
40, 40A, 40B: Mobile terminal
41, 51: Display
4111: Participant image display area
50: Desktop personal computer

The invention claimed is:

1. An avatar display device comprising:
an obtaining part implemented by at least one processor obtaining captured image data of a person;
a second obtaining part implemented by the processor obtaining, from the captured image data, depth data or image data of the person;
a generating part implemented by the processor composing a three-dimensional model of a head part of the person and a three-dimensional model of a body part of the person in accordance with the depth data or the image data to generate an avatar; and
a display part implemented by the processor displaying, in an image display area of an information communication device, the avatar that is caused to move the three-dimensional model of the body part with reference to an orientation of the neck of the person and move the three-dimensional model of the head part in accordance with a result of tracking of eyes, a nose, and a mouth of the person.

2. The avatar display device of claim 1, further comprising:
a texture generating part configured to generate, from the captured image data, texture data of the person, wherein
the generating part is further configured to combine the texture data into the three-dimensional model.

3. The avatar display device of claim 1, wherein the image display area is a participant image display area that displays a participant who participates in a communication system, and
the display part is further configured to display, in the participant image display area, the avatar that is caused to follow the motion of the person.

4. The avatar display device of claim 1, wherein the image display area is a participant image display area that displays a participant who participates in a communication system involving use of a moving image, and the display part is further configured to replace the person displayed in the participant image display area with the avatar that is caused to follow the motion of the person.

5. The avatar display device of claim 1, further comprising:
a converting part configured to convert a data format of the avatar generated by the generating part, the converting part carrying out the conversion of the data format of the avatar so that the data format of the avatar is compatible with an image data format of an application used by the information communication device.

6. The avatar display device of claim 1, wherein
the generating part is further configured to generate the avatar with use of at least one of data of eyes, data of a nose, and data of a mouth that are included in the depth data or the image data.

7. The avatar display device of claim 1, further comprising:
a tracking part configured to track a face of the person in the captured image data, wherein
the display part is further configured to cause, with reference to an orientation of the face that is tracked, the avatar to follow the motion of the person.

8. The avatar display device of claim 1, wherein the model of the body part includes a neck of the person and a part lower than the neck.

9. An avatar generating device comprising:
an obtaining part implemented by at least one processor obtaining captured image data of a person;
a second obtaining part implemented by the processor obtaining, from the captured image data, depth data or image data of the person;
a generating part implemented by the processor composing a three-dimensional model of a head part of the person and a three-dimensional model of a body part of the person in accordance with the depth data or the image data to generate an avatar; and
an output part implemented by the processor outputting the avatar thus generated that is caused to move the three-dimensional mode of the body part with reference to an orientation of the neck of the person and move the three-dimensional model of the head part in accordance with a result of tracking of eyes, a nose, and a mouth of the person.

10. A non-transitory computer readable storage medium storing instructions that, when executed by at least one processor of an electronic device cause the device to:
obtain captured image data of a person;
obtain, from the captured image data, depth data or image data of the person;
compose a three-dimensional model of a head part of the person and a three-dimensional mode of a body part of the person in accordance with the depth data or the image data to generate an avatar; and
display in an image display area of an information communication device, the avatar that is caused to move the three-dimensional model of the body part with reference to an orientation of the neck of the person and move the three-dimensional model of the head part in accordance with a result of tracking of eyes, a nose, and a mouth of the person.

* * * * *